(12) United States Patent
Webster et al.

(10) Patent No.: US 7,643,453 B2
(45) Date of Patent: Jan. 5, 2010

(54) LEGACY COMPATIBLE SPATIAL MULTIPLEXING SYSTEMS AND METHODS

(76) Inventors: Mark A. Webster, 139 Island View Dr., Indian Harbor Beach, FL (US) 32937; Michael J. Seals, 3870 Shady Run Rd., Melbourne, FL (US) 32934

(*) Notice: Subject to any disclaimer, the term of this patent is extended or adjusted under 35 U.S.C. 154(b) by 674 days.

(21) Appl. No.: 11/159,812

(22) Filed: Jun. 22, 2005

(65) Prior Publication Data

US 2005/0281241 A1 Dec. 22, 2005

Related U.S. Application Data

(60) Provisional application No. 60/581,358, filed on Jun. 22, 2004.

(51) Int. Cl.
*H04W 4/00* (2009.01)
(52) U.S. Cl. .................. 370/334; 375/267; 375/316
(58) Field of Classification Search .......... 370/332, 370/334, 343, 208, 203, 355, 342; 375/132, 375/232, 233, 272, 275, 303, 323
See application file for complete search history.

(56) References Cited

U.S. PATENT DOCUMENTS

| | | | |
|---|---|---|---|
| 6,574,237 B1 | 6/2003 | Bullman et al. | 370/465 |
| 6,754,170 B1 | 6/2004 | Ward | 370/208 |
| 6,754,195 B2 | 6/2004 | Webster et al. | |
| 6,785,341 B2 | 8/2004 | Walton et al. | |
| 6,842,487 B1 | 1/2005 | Larsson | 375/260 |
| 6,850,481 B2 | 2/2005 | Wu et al. | |
| 6,862,271 B2 | 3/2005 | Medvedev et al. | |
| 7,310,304 B2* | 12/2007 | Mody et al. | 370/208 |
| 7,444,134 B2 | 10/2008 | Hansen et al. | |
| 7,499,504 B2* | 3/2009 | Soffer | 375/316 |
| 7,522,514 B2 | 4/2009 | Tzannes et al. | |
| 2001/0053143 A1 | 12/2001 | Li et al. | |
| 2002/0118727 A1* | 8/2002 | Kim et al. | 375/146 |
| 2002/0136276 A1 | 9/2002 | Franceschini et al. | 375/148 |
| 2002/0181390 A1 | 12/2002 | Mody et al. | |
| 2003/0012160 A1 | 1/2003 | Webster et al. | 370/335 |
| 2003/0016621 A1 | 1/2003 | Li | 370/203 |
| 2003/0072284 A1 | 4/2003 | Webster et al. | 370/335 |
| 2003/0185241 A1 | 10/2003 | Lu et al. | 370/476 |
| 2004/0047284 A1 | 3/2004 | Eidson | 370/203 |
| 2004/0105512 A1 | 6/2004 | Priotti | |

(Continued)

OTHER PUBLICATIONS

IEEE Std 802®-2001, "802® IEEE Standard for Local and Metropolitan Area Networks: Overview and Architecture," IEEE Computer Society, Mar. 8, 2002.

(Continued)

*Primary Examiner*—Robert W Wilson
(74) *Attorney, Agent, or Firm*—McDonnell Boehnen Hulbert & Berghoff LLP

(57) ABSTRACT

Embodiments of legacy compatible spatial multiplexing systems and methods are disclosed. One method embodiment, among others, comprises receiving long training symbols and cyclic shifted long training symbols corresponding to legacy preamble portions of packets corresponding to first and second transmit signals, receiving long training symbols and inverted cyclic shifted long training symbols corresponding to spatial multiplexing portions of packets corresponding to first and second transmit signals, and combining the symbols corresponding to the first and second transmit antennas to estimate the respective channels.

37 Claims, 18 Drawing Sheets

U.S. PATENT DOCUMENTS

2004/0266339 A1  12/2004  Larsson .................... 455/7
2005/0271157 A1* 12/2005  van Zelst et al. ........... 375/267
2006/0018249 A1  1/2006   Shearer et al.

OTHER PUBLICATIONS

Manoneet Singh, et al. and Bruce Edwards, et al., "WwiSE proposal: High throughput extension to the 802.11," IEEE 11-04-0886-00-000n, Aug. 13, 2004.

Syed Aon Mujtaba, "TGn Sync Proposal Technical Specification," IEEE 802.11-04/889r0, Aug. 13, 2004.

Aon Mujtaba, Adrian P. Stephens, Alek Purkovic, Andrew Myles, Brian Johnson, Daisuke Takeda, Darren McNamara. Dongjun (DJ) Lee, David Bagby, Eldad Perahia, Huanchun Ye, Hui-Ling Lou, James Chen, James Mike Wilson, Jan Boer, Jari Jokela, Jeff Gilbert, Joe Pitarressi, Jorg Habetha, John, Sadowsky, Jon Rosdahl, Luke Qian, Mary Cramer , Masahiro Takagi, Monisha Ghosh, Nico van Waes, Osama Aboul-Magd, Paul Feinberg, Pen Li, Peter Loc, Pieter-Paul Giesberts, Richard van Leeuwen, Ronald Rietman, Seigo Nakao, Sheung Li, Stephen Shellhammer, Takushi Kunihior, Teik-Kheong, Tomoko Adachi, Tomoya Yamaura, Tsuguhide Aoki, Won-Joon Choi, Xiaowen Wang, Yasuhiko Tanabe, Yasuhiro Tanaka, Yoshiharu Doi, Yichi Morioka, Youngsoo Kim, "TGn Sync Proposal," IEEE 802.11-04/888r0, Aug. 13, 2004.

VK Jones, Neil Hamady, Jason Trachewsky, Michael Seals, Stephan ten Brink, George Vlantis, Sean Coffey,"WwiSE IEEE 802.11n Proposal," IEEE 802.11-04/0935r3, Sep. 16, 2004.

U.S. Appl. No. 11/121,611, filed May 4, 2005.

IEEE P802.11-Task Group N-Meeting Update, http://grouper.ieee.org/groups/802/11/Reports/tgn_update.htm, pp. 1-7.

Jon Rosdahl, "Draft PAR for High Throughput Study Group," Nov. 15, 2002, Revision R1: Jan. 16, 2003, IEEE 802.11-02/798r1, pp. 1-9.

Jon Rosdahl, "Draft PAR for High Throughput Study Group," Nov. 15, 2002, Revision R6: Mar. 13, 2003, IEEE 802.11-02/798r6, pp. 1-8.

Jon Rosdahl, "Criteria For Standards Development," (Five Criteria) Nov. 15, 2002, IEEE 802.11-02/799r0, pp. 1-4.

Jon Rosdahl, "Criteria For Standards Development," (Five Criteria) Nov. 15, 2002, Revision 1: Jan. 16, 2003, IEEE 802.11-02/799r1, pp. 1-4.

Jon Rosdahl, "Criteria For Standards Development," (Five Criteria) Nov. 15, 2002, Revision 1: Jan. 16, 2003, IEEE 802.11-02/799r2, pp. 1-5.

Jon Rosdahl, "Criteria For Standards Development," (Five Criteria) Nov. 15, 2002, Revision 4: Mar. 11, 2003, IEEE 802.11-02/799r3, pp. 1-4.

Jon Rosdahl, "Criteria For Standards Development," (Five Criteria) Nov. 15, 2002, Revision 5: Mar. 13, 2003, IEEE 802.11-02/799r5, pp. 1-4.

Webster, et al., "Cyclic Diversity Systems and Methods," having U.S. Appl. No. 11/121,661, filed May 4, 2005.

Webster, et al., "Systems and Methods for Transmitter Diversity Expansion," having U.S. Appl. No. 11/411,619, filed Apr. 26, 2006.

Webster, et al., "Packet Generation Systems and Methods," having U.S. Appl. No. 11/106,915, filed Apr. 15, 2005.

Supplement to IEEE Standard for Information Technology, "Part 11: Wireless LAN Medium Access Control (MAC) and Physical Layer (PHY) specifications: High-speed Physical Layer in the 5 GHz Band," IEEE std 802.11, 1999 Edition. 83 Pgs.

International Search Report for PCT/US2005/022249 dated May 15, 2006.

* cited by examiner

LEGACY COMPATIBLE SPATIAL MULTIPLEXING SYSTEMS AND METHODS

CROSS-REFERENCE TO RELATED APPLICATION

This application claims the priority and benefit of U.S. provisional application having Ser. No. 60/581,358, filed Jun. 22, 2004, which is entirely incorporated herein by reference.

BACKGROUND OF THE INVENTION

1. Field of the Invention

The present disclosure is generally related to communication systems, and, more particularly, is related to wireless communication systems and methods.

2. Related Art

Wireless communication systems are widely deployed to provide various types of communication such as voice, data, and so on. These systems may be based on code division multiple access (CDMA), time division multiple access (TDMA), orthogonal frequency division multiplex (OFDM), or some other multiplexing techniques. OFDM systems may provide high performance for some channel environments. FIG. 1A is a block diagram that illustrates an exemplary single-in, single-out (SISO) orthogonal frequency division multiplexing (OFDM) communication system 100 (herein, SISO system 100) that is compliant with IEEE 802.11 standards. The SISO system 100 comprises a transmitter device 102 and a receiver device 104. The transmitter device 102 comprises a transmit (TX) processor 106, radio circuitry 108, and antenna 110. The receiver device 104 comprises an antenna 112, radio circuitry 114, and receive (RX) processor 116.

The transmitter device 102 comprises well-known circuitry that divides the high-speed data signals into tens or hundreds of lower speed signals and transmits the signals in parallel over respective frequencies within a radio frequency (RF) signal that comprise subcarrier frequencies ("subcarriers"). The frequency spectra of the subcarriers overlap so that the spacing between them is minimized. The subcarriers are also orthogonal to each other so that they are statistically independent and do not create cross-talk or otherwise interfere with each other. FIG. 1B is a schematic diagram that illustrates an exemplary OFDM symbol 118 corresponding to signals processed in the SISO system 100. In 802.11 standards, each OFDM symbol 118 provided by the transmitter device 102 comprises 52 subcarriers (partially shown for brevity) centered at a defined reference or carrier frequency, with a bandwidth (BW) of approximately 20 mega-Hertz (MHz). The spectrum resulting from processing at the receiver device 104 is typically centered at the same reference or carrier frequency.

In operation, the transmit processor 106 receives data signals (designated as TX data1 at a defined data rate designated as TX Rate1). The transmit processor 106 encodes and interleaves the data and maps the interleaved data into respective subcarrier channels as frequency domain symbols. Further processing by the transmit processor 106 may result in the insertion of training signals, cyclic extensions (e.g., guard intervals), and additional processing such as inverse fast Fourier transformations (IFFT) and wave shaping. The processed subcarriers are provided to the radio circuitry 108, which provides filtering, modulation, amplification, and upconversion functionality, ultimately resulting in the transmission of data from antenna 110.

FIG. 1C is block diagram that describes an exemplary OFDM packet structure 150 used in the transmission of information between the transmitter device 102 and the SISO receiver device 104. Additional information about the packet structure can be found in 802.11 standards. The packet structure 150 is generated in a baseband processing section (e.g., in or in cooperation with an inverse fast Fourier transform (IFFT) operation) of the transmitter device 102, and comprises several sections. Sections A and B are comprised of short training symbols (STS). Section A is used by a communication system to provide signal detection, automatic gain control (AGC), and diversity selection functionality. Section B is used by a communication system to provide coarse frequency offset estimation and timing synchronization. Section C, sometimes referred to as a long training symbol (LTS), is used by a communication system to provide channel estimation and fine frequency offset estimation. Sections A-C are typically referred to as the preamble portion of a packet. Section D is referred to as the signal field or header, and contains data rate and packet length information. Sections E and F are OFDM symbols, such as OFDM symbol 118a. Sections D, E, and F provide rate length, service and data, and data, respectively.

At the receiver device 104, the antenna 112 receives the transmitted data, which is provided to radio circuitry 114 to complement the processing that occurred at radio circuitry 108. The data is then provided to receive (RX) processor 116, which provides clock recovery, cyclic extension removal, transformations (e.g., fast Fourier transformation, FFT), demapping, deinterleaving, and decoding to recover the TX data1 as RX data1. Transmitter and receiver devices that are compliant to IEEE 802.11a/g standards, such as shown in FIG. 1A, are often referred to as legacy radios or legacy devices.

Continual demand for increased data rates has resulted in the advancement of communications system technology, such as the use of multiple antennas in a single device having transmitter and/or receiver functionality. In terrestrial communication systems (e.g., a cellular system, a broadcast system, a multi-channel multi-point distribution system (MMDS), among others), a RF modulated signal from a transmitter device may reach a receiver device via a number of transmission paths. The characteristics of the transmission paths typically vary over time due to a number of factors such as fading and multi-path. To provide diversity against deleterious path effects and improve performance, multiple transmit and receive antennas may be used for data transmission. Spatial multiplexing refers to a technique where a transmission channel is divided into multiple "spatial channels" through which independent streams can be transmitted and received via multiple transmit and receive antennas, respectively.

FIG. 2 is a block diagram that illustrates a multiple-input multiple-output (MIMO) OFDM communication system 200 (herein, MIMO system 200). The MIMO system 200 employs multiple transmit antennas and multiple receive antennas for data transmission. Through spatial multiplexing, a MIMO channel formed by the transmit and receive antennas may be decomposed into independent channels. Each of the independent channels is also referred to as a spatial subchannel of the MIMO channel. The MIMO system 200 comprises a transmitter device 202 and receiver device 204. The transmitter device 202 comprises transmit (TX) processors 206 and 212, radio circuitry 208 and 214, and antennas 210 and 216. The receiver device 204 comprises antennas 218 and 226, radio circuitry 220 and 228, and receive (RX) processors 224 and 230. The transmit processors 206 and 212 and the radio circuitry 208 and 214 comprise similar circuitry to that found in and described for transmit processor 106 (FIG. 1A), with the addition of circuitry for implementing spatial multiplexing. The radio circuitry 220 and 228 and receive processors 224 and 230 also share common circuitry with like components shown in and described for receiver device 104 (FIG. 1A). The receive processors may comprise signal separating functionality to remove interference caused by multiple transmit signals occupying the same bandwidth at the receive antennas 218 and 226, and thus may be used to increase the data rate.

In developing systems such as MIMO that utilize multiple-antenna devices, there is a need to consider legacy receivers (e.g., single-input, single output (SISO), OFDM receivers) and the design challenges concomitant with implementing transmitters with multiple antennas in an environment that still uses legacy receivers.

SUMMARY

Embodiments of legacy compatible spatial multiplexing systems and methods are disclosed. One method embodiment, among others, comprises receiving long training symbols and cyclic shifted long training symbols corresponding to legacy preamble portions of packets corresponding to first and second transmit signals, receiving long training symbols and inverted cyclic shifted long training symbols corresponding to spatial multiplexing portions of packets corresponding to first and second transmit signals, and combining the symbols corresponding to the first and second transmit antennas to estimate the respective channels.

Other systems, methods, features, and advantages of the disclosed systems and methods will be or become apparent to one with skill in the art upon examination of the following drawings and detailed description. It is intended that all such additional systems, methods, features, and advantages be included within this description and be within the scope of the disclosure.

BRIEF DESCRIPTION OF THE DRAWINGS

Many aspects of the disclosed systems and methods can be better understood with reference to the following drawings. The components in the drawings are not necessarily to scale, emphasis instead being placed upon clearly illustrating the principles of the disclosed systems and methods. Moreover, in the drawings, like reference numerals designate corresponding parts throughout the several views.

DETAILED DESCRIPTION

Figure 1A:
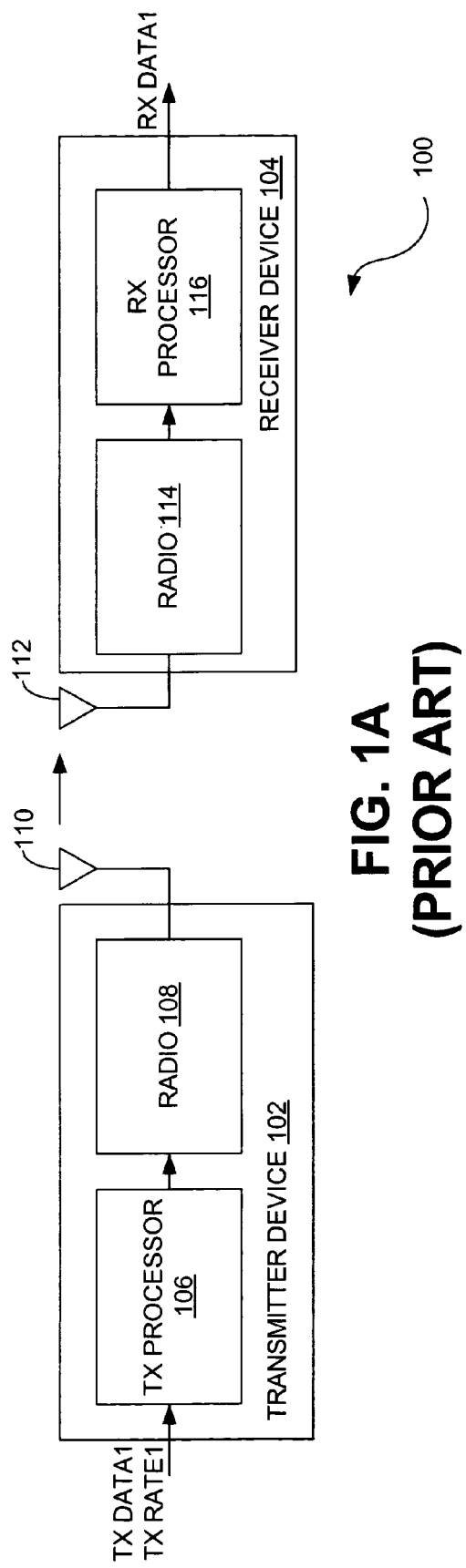
FIG. 1A is a block diagram that illustrates an exemplary single-in, single-out (SISO) orthogonal frequency division multiplexing (OFDM) communication system.
Figure 1B:
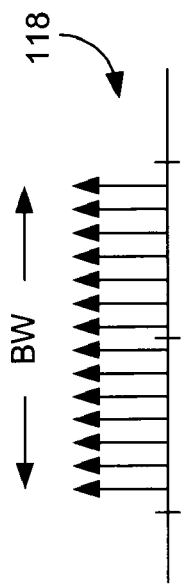
FIG. 1B is a schematic diagram that illustrates subcarriers of an OFDM symbol processed in the SISO OFDM communication system shown in FIG. 1A.
Figure 1C:
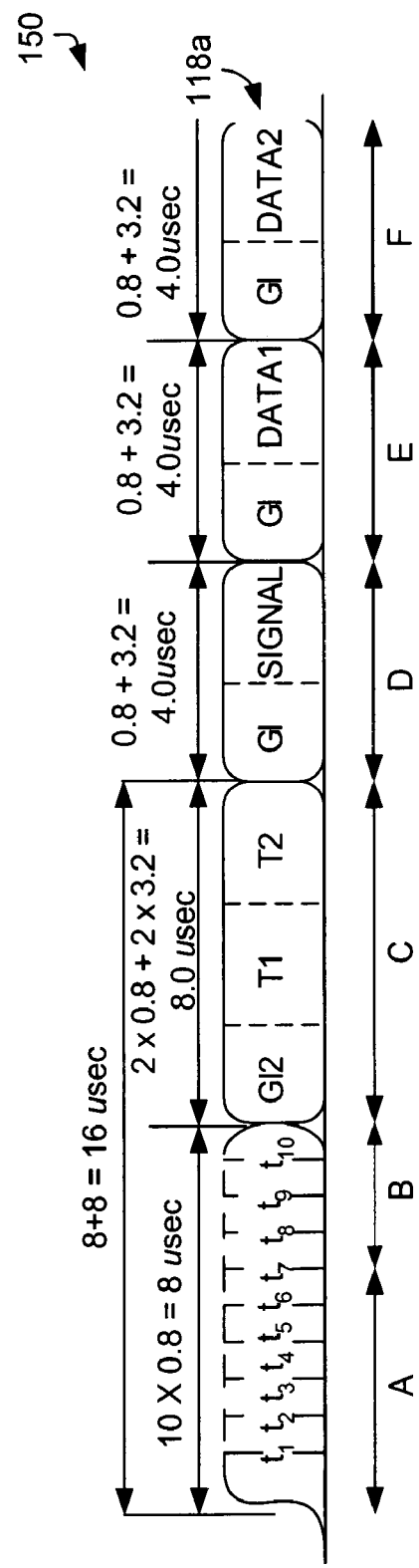
FIG. 1C is a block diagram that illustrates an exemplary OFDM packet structure used in SISO and multiple-input, multiple-output (MIMO) OFDM communication systems.
Figure 2:
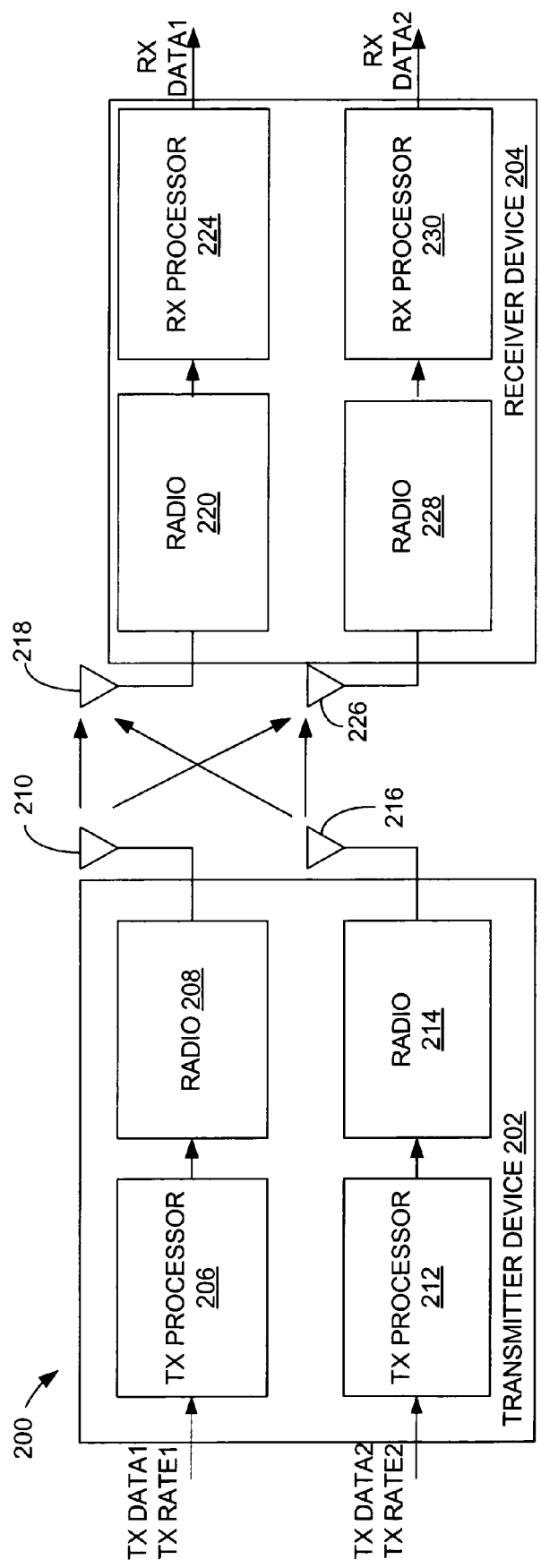
FIG. 2 is a block diagram that illustrates a MIMO OFDM communication system.

Disclosed are various embodiments of legacy compatible, spatial multiplexing (SM) systems and methods (herein, referred to as LCSM systems). Such embodiments are described in the context of multiple-input multiple-output (MIMO), orthogonal frequency division multiplex (OFDM) communication systems. In one embodiment, an LCSM system comprises one or more transmit modules that include waveshape logic configured to generate transmit waveforms (e.g., packet segments) that enable a receiver to implement channel estimate processing corresponding to signals emitted from multiple transmit antennas. The waveshape logic generates, in one embodiment, a two-part packet that is employed in both MIMO spatial multiplexed packet transmission and reception and legacy transmission and reception. That is, a first portion of a packet includes a legacy preamble that is compatible for use with legacy receivers (e.g., 801.11a/g receivers). Legacy receivers recognize the first portion as a normal legacy preamble, and thus process the corresponding packet in a conventional manner. A second portion of the packet includes a cyclic shifted, inverted long training symbol that is used to enable successful processing by a SM MIMO receiver (e.g., 802.11n compatible receiver).

Certain LCSM system embodiments described herein reuse the cyclic shifted legacy portion of a packet to enable orthogonal channel estimation at either a MIMO receiver in a spatial multiplexing environment or a legacy receiver. With spatial multiplexing techniques, two or more signals can be delivered in the same frequency channel, providing a mechanism for a receiver to exploit multipath signals (e.g., signals emitted from each transmit antenna that bounce off structures to create multiple signals arriving at different angles at a receiver) to mitigate or eliminate interference that the receiver experiences between two or more transmit signals. That is, the cyclic shift, which may be implemented as an advance or delay, mitigates (or eliminates) self-interference of a preamble portion of the transmitted signal, and enables the transmission of legacy preamble portions provided from multiple transmit antennas. By reusing the cyclic shifted preambles, channel estimation is efficient since such channel estimation makes use of the legacy portion of the packet. Reusing the cyclic shifted portion also allows digital circuitry to be reused.

In one embodiment, channel estimation is performed using Walsh coding, which is a well-known waveform algorithm that uses addition and subtraction to separate two signals. Thus, joint channel estimation of signals, provided from multiple transmit antennas, by a receiver is enabled with reuse of the legacy preamble in the channel estimation.

Certain LCSM system embodiments are described in the context of a 2×2 MIMO OFDM system that utilizes Walsh code orthogonalization. However, one of ordinary skill in the art would appreciate that other spatial multiplexing orders (e.g., 3×3, 4×4, etc.) and other channel estimation methods can be used and hence are considered within the scope of the disclosure.

Figure 3:
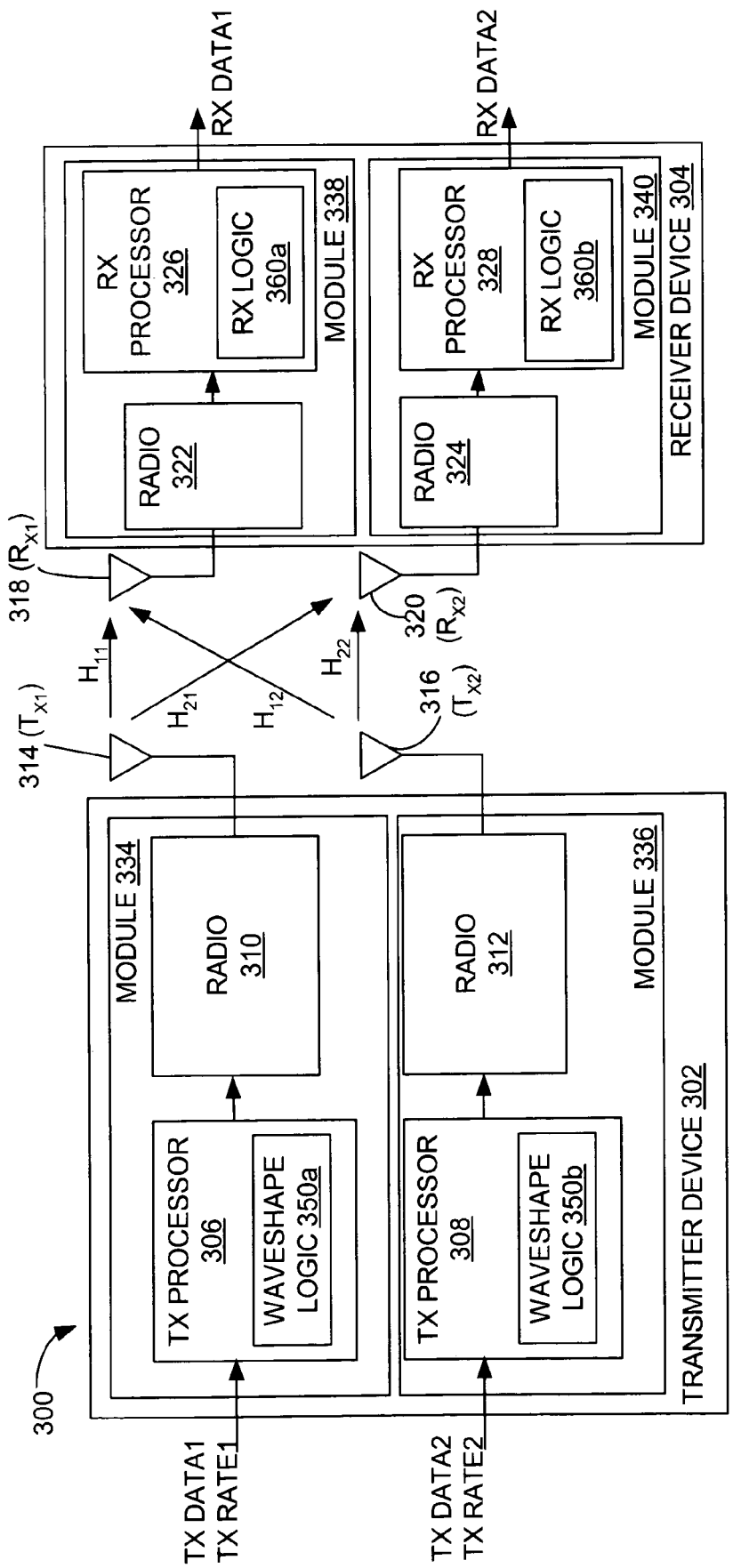
FIG. 3 is a block diagram that illustrates an embodiment of a legacy compatible spatial multiplexing (LCSM) system.

FIG. 3 is a block diagram that illustrates an embodiment of a LCSM system 300. The LCSM system 300, though shown encompassing transmit and receive components, may comprise select components of one or more of the same in some embodiments. In one embodiment, the LCSM system 300 comprises a multiple-input multiple-output (MIMO), orthogonal frequency division multiplexing (OFDM) communication system that generates a packet having a legacy preamble portion and a MIMO spatial multiplexing portion, and reuses the legacy preamble portion to provide orthogonal channel estimation. The LCSM system 300 comprises a transmitter device 302 and a receiver device 304. The transmitter device 302 may include functionality of the receiver device 304, and the receiver device 304 may comprise functionality of the transmitter device 302. Further, the described embodiments may be embodied in many wireless communication devices, including computers (desktop, portable, laptop, etc.), consumer electronic devices (e.g., multi-media players), compatible telecommunication devices, telephone communication systems and devices (e.g., voice over IP phones), personal digital assistants (PDAs), or any other type of network devices, such as printers, fax machines, scanners, hubs, switches, routers, set-top boxes, televisions with communication capability, etc.

The transmitter device 302 comprises two modules 334 and 336. Module 334 comprises a transmit (TX) processor 306, radio circuitry 310, and an antenna 314 (herein, also first transmit antenna, or $T_{X1}$). Module 336 comprises a transmit (TX) processor 308, radio circuitry 312, and antenna 316 (herein, also second transmit antenna, or $T_{X2}$). The transmit processors 306 and 308 comprise waveshape logic 350a and 350b, respectively. The waveshape logic 350a, 350b generate two-part packets, as described below. Briefly, for data symbols and signal fields, transmit processors 306 and 308 encode and interleave the incoming data (designated TX data1 and TX data2 at TX data rate1 and TX data rate2, respectively). Transmit processors 306 and 308 map the interleaved data into respective subcarrier channels as frequency domain symbols, and include further processing for the insertion of training signals, cyclic extensions (e.g., guard intervals), preamble generation, and inverse fast Fourier transformation (IFFT) and wave shaping. The processed subcarriers are provided to the radio circuitry 310 and 312, which provides filtering, modulation, and amplification functionality.

The receiver device 304 comprises modules 338 and 340. Module 338 comprises an antenna 318 (herein, also first receive antenna, or $R_{X1}$), radio circuitry 322, and receive (RX) processor 326. Receive processor 326 comprises receive (RX) logic 360a, which provides channel estimation functionality and multipath separation as described below. The module 338 may comprise additional circuitry, such as a signal separator, among other components as would be understood by one having ordinary skill in the art. Module 340 comprises an antenna 320 (herein, also second receive antenna, or $R_{X2}$), radio circuitry 324, and receive (RX) processor 328, which comprises receive (RX) logic 360b, which provides channel estimation functionality and multipath separation as described below. The module 340 may comprise additional circuitry, such as a signal separator, among other components as would be understood by one having ordinary skill in the art.

At the receiver device 304, the antennas 318 and 320 receive the transmitted data, and provide the same to radio circuitry 322 and 324, which provide downconversion functionality among other functionality to complement the processing that occurred at radio circuitry 310 and 312. The corresponding downconverted signals are provided to receive processors 326 and 328 to separate multipath signals and recover the original data as RX data1 and RX data2. Receive processors 326 and 328 may provide clock recovery, cyclic extension removal, transformation (e.g., fast Fourier transformation, FFT), demapping, deinterleaving, and/or decoding functionality, among other functionality.

One or more components of the LCSM system 300, such as the waveshape logic 350a, 350b and the receive logic 360a, 360b, can be implemented using digital circuitry, analog circuitry, or a combination of both. Also, one or more components of the LCSM system 300 can be implemented in hardware, software, firmware, or a combination thereof. If implemented in hardware, the one or more components of the LCSM system 300 can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

If implemented partly or wholly in software, the one or more components of the LCSM system 300 can be comprised of software or firmware that is stored in a memory and that is executed by a suitable instruction execution system.

Figure 4A:
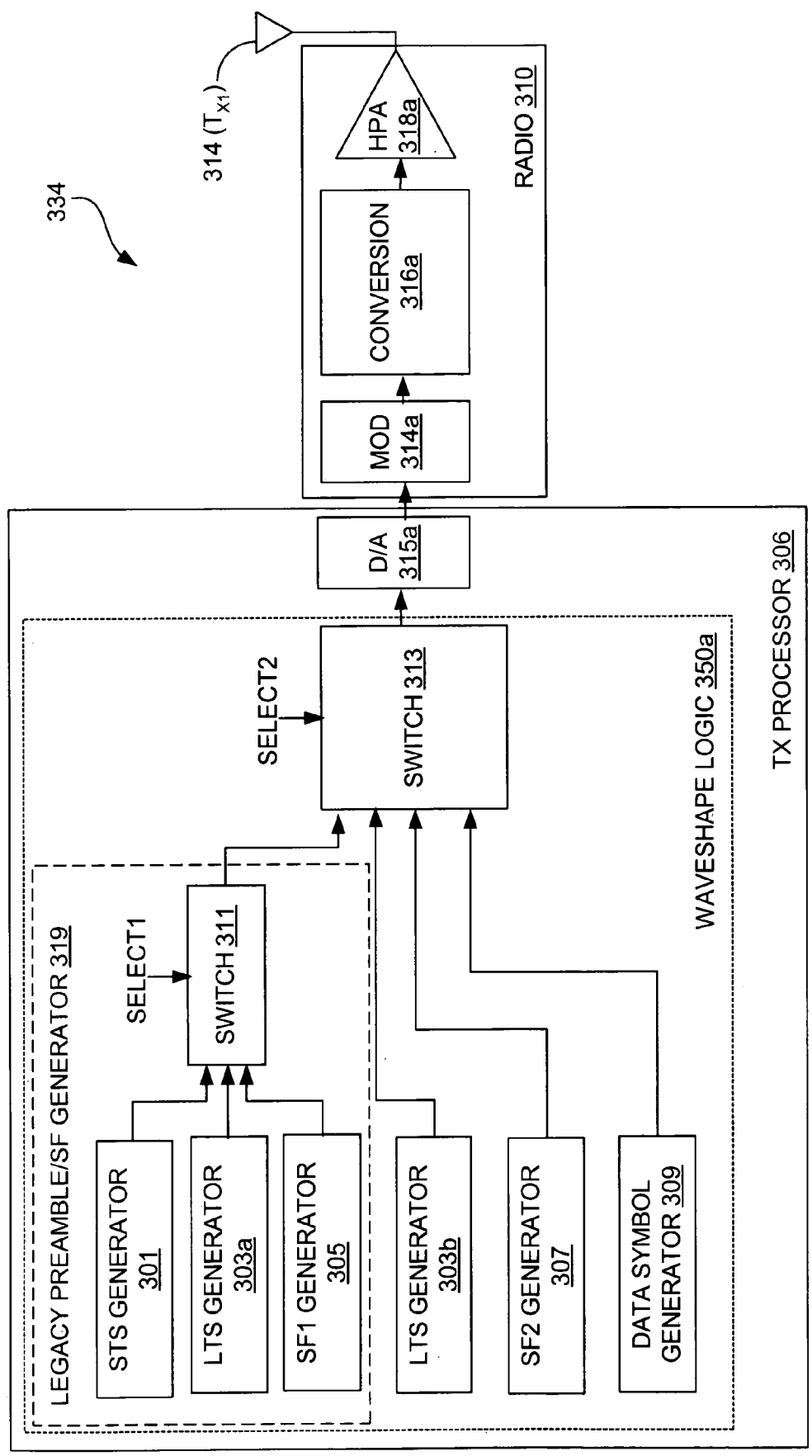
FIG. 4A is a block diagram that illustrates an embodiment of a transmit module of the LCSM system shown in FIG. 3.

FIG. 4A is a block diagram that illustrates an embodiment of the module 334 of FIG. 3. The module 334 comprises the transmit processor 306, radio 310, and first antenna 314. The transmit processor 306 comprises a waveshape logic 350a for generating the packet structure. The waveshape logic comprises a legacy preamble/signal field (SF) generator 319. The legacy preamble/SF generator 319 comprises a short training symbol (STS) generator 301, a long training symbol (LTS) generator 303a, a SF1 generator 305, and a switch 311. The STS generator 301 and LTS generator 303a are configured to generate segments of a legacy preamble. The STS generator 301 generates a STS segment and the LTS generator 303a generates a LTS segment in conformity to 802.11 standards. The SF1 generator 305 generates a signal field segment. These segments are input to the switch 311, and based on a control signal (Select1), are provided as a coordinated output to switch 313, which also is part of the waveshape logic 350a. The waveshape logic 350a further includes a LTS generator 303b, a SF2 generator 307, and a data symbol generator 309. In one embodiment, the LTS generator 303b is the same device as the LTS generator 303a, just designated with different letters ("a" and "b") to distinguish their respective role in supplying a LTS segment for a legacy preamble portion (LTS generator 303a) and a spatial multiplexing portion (LTS generator 303b). The SF2 generator 307 receives data rate information, among other information pertaining to spatial multiplexing environments, and the data symbol generator 309 receives data bits. The switch 313 receives the respective segments from generators 303b, 307, and 309, and also receives the segments from switch 311, and based on the control input (Select2), provides the segments in coordinated fashion to the digital-to-analog (D/A) converter 315a of the transmit processor 306.

It would be understood by one having ordinary skill in the art that transmit processor 306 may comprise additional circuitry, such as a forward error correction (FEC) encoder and an interleaver/mapper to be used in conjunction with data symbol and signal field processing as is known, as well as symbol shape logic, among other components. For instance, an FEC encoder (or FEC coder) may receive information from a data source and encode the received information according to one or more encoding schemes. The FEC encoder may provide the encoded information to an interleaver/mapper, which interleaves or distributes the encoded information and maps (e.g., over approximately 64-subcarriers) the same for use over the first transmit antenna 314. Symbol shape logic provides interpolator functionality as well as low-pass filter smoothing of edges between successive OFDM symbols, in one embodiment creating tapered trailer and leading edges of each OFDM symbol.

The radio 310 receives the analog signal corresponding to the packet structure generated in the waveshape logic 350a. The radio 310 comprises a modulator 314a (e.g., in-phase/quadrature (I/Q) modulator and oscillator), conversion logic 316a (e.g., oscillator and mixer), and high power amplifier (HPA) 318a. It would be appreciated by one having ordinary skill in the art that fewer, additional, and/or different components can be included in the module 334. Within the radio 310, the analog transmission signals are modulated, upconverted, and amplified/filtered at modulator 314a, conversion logic 316a, and HPA 318a, respectively. The resulting signal is then transmitted over first transmit antenna 314.

Figure 4B:
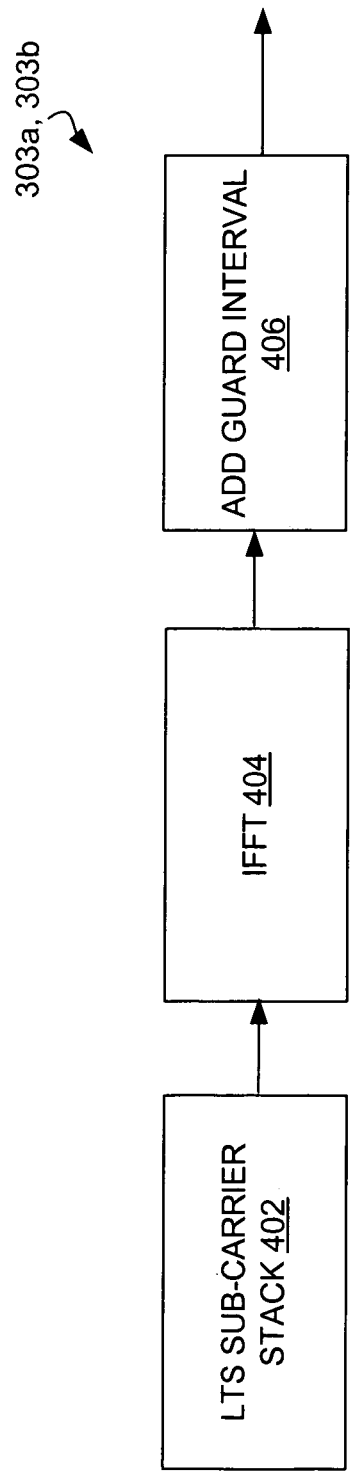
FIG. 4B is a block diagram that illustrates an embodiment of a long training symbol (LTS) generator of the transmit module shown in FIG. 4A.

FIG. 4B illustrates an embodiment of LTS generator 303a, 303b, and comprises a long training symbol (LTS) subcarrier stack 402, inverse fast Fourier transform (IFFT) circuitry 404 (e.g., 64-point IFFT), and an add guard interval module 406. LTS subcarriers from the LTS subcarrier stack 402 are provided to the IFFT circuitry 404 for formation into an OFDM symbol. The IFFT circuitry 404 converts the subcarriers to its corresponding time-domain representation (an OFDM symbol), and removes various subcarriers.

Figure 4C:
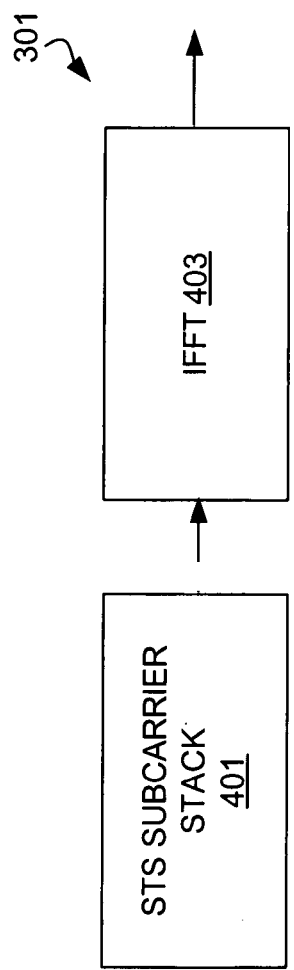
FIG. 4C is a block diagram that illustrates an embodiment of a short training symbol (STS) generator of the transmit module shown in FIG. 4A.

FIG. 4C is a block diagram that illustrates an embodiment of the STS generator 301. Like the LTS generator 303a, 303b, the STS generator 301 generates a deterministic signal waveform that is used at a receiver to estimate channel information. The STS generator 301 comprises a STS subcarrier stack 401 that feeds an IFFT 403. The components of the STS generator comprise similar functionality for STS generating STS segments as like components described above for the LTS segments, and thus discussion of the same is omitted for brevity.

Figure 4D:
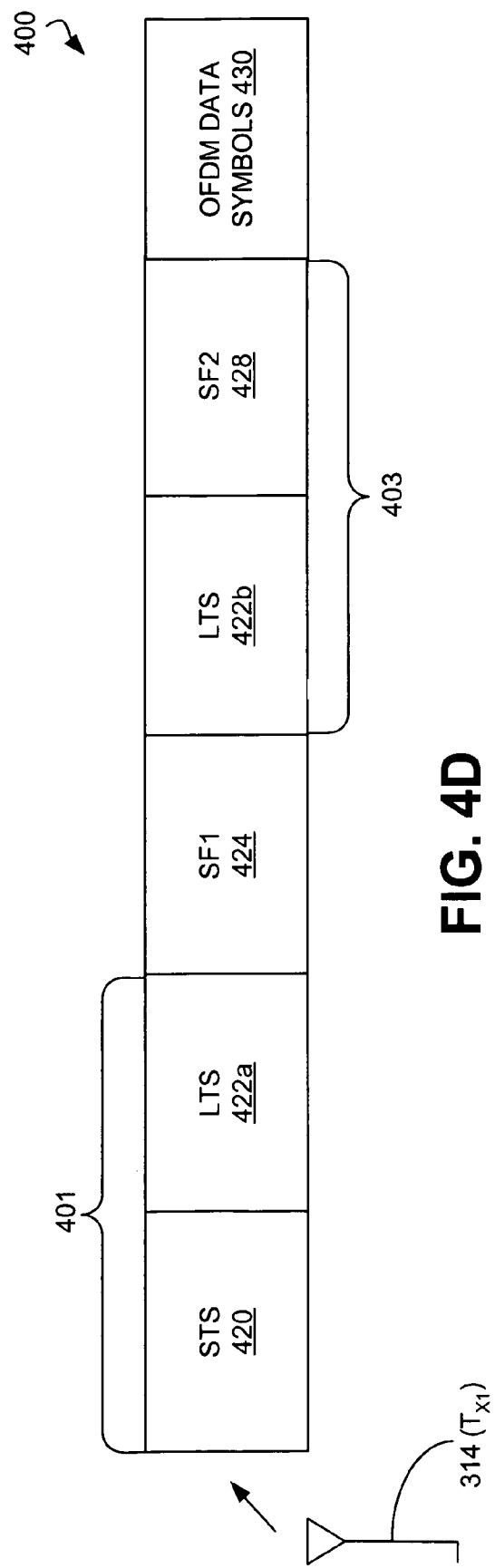
FIG. 4D is a block diagram that illustrates an exemplary packet structure generated by the waveshape logic and transmitted from a first antenna shown in FIG. 4A.

FIG. 4D is a block diagram that illustrates an exemplary packet structure 400 generated by the waveshape logic 350a and transmitted from the first transmit antenna 314 ($T_{X1}$). Further, the description of the various segments described in association with FIG. 4D may also be applied to like segments for packet segments described below with or without cyclic shifting implemented for the respective segment. The packet structure 400 comprises a legacy preamble portion 401 and a MIMO, spatial multiplexing (SM) portion 403. The legacy preamble portion 401 comprises a short training symbol (STS) segment 420 and a long training symbol (LTS) segment 422a. Also included in the packet structure 400 is a signal field (SF1) segment 424. The MIMO, SM portion 403 comprises the reused LTS (designated as 422b to distinguish between portions) segment 422b and a signal field (SF2) segment 428. The STS segment 420 is used by the LCSM system 300 to provide signal detection, automatic gain control (AGC), and diversity selection functionality, as well as to provide coarse frequency offset estimation and timing synchronization. The LTS segments 422a, 422b are used by the LCSM system 300 to provide channel estimation and fine frequency offset estimation. The LTS segments 422a, 422b are fixed, deterministic waveforms (e.g., deterministic subcarriers) that are used to perform channel estimation. The SF1 segment 424 conveys the length of a packet 400 in time, which is used by a receiver to assist the receiver in determining when a packet is complete and ready for analysis (e.g., error detection, correction, etc.). The SF1 segment 424 also conveys a data rate of the packet 400.

The MIMO SM portion 403 is a new portion of the packet 400 according to one embodiment. With conventional single-input, single output (SISO) receivers, each receive antenna is only needed to estimate the channel corresponding to a single transmit antenna. However, with two transmit antennas as found in the LCSM system 300, two channels are estimated at each receive antenna. In other words, the LTS segment 422a is used again in portion 403 (designated 422b) to enable the receive module 338 to estimate the channels corresponding to both transmit antennas 314 and 316, as described below. With regard to signal field (SF2) segment 428, information conveyed includes data rates corresponding to MIMO SM systems (e.g., 108 MBs for 802.11n systems), the SM order (e.g., $2^{nd}$ order for 2×2, $3^{rd}$ order, $4^{th}$ order, etc.), information about error detection and type (e.g., Viterbi, turbo), etc. MIMO SM receivers acquire and process, substantially in parallel, the legacy portion 401 and MIMO SM portion 403 to enable processing according to the capabilities to which the receiver is configured.

Note that, as is true with packet portions described below, different configurations may be used. For instance, the SF2 segment 428 may immediately follow SF1 segment 424 in some embodiments. Further, the duration of the various segments described above and below may be configured differently. For instance, one embodiment for SF2 segment 428 may require 4 microseconds duration. Some embodiments may require more duration, depending on the information that is to be conveyed, among other design considerations.

Figure 5A:
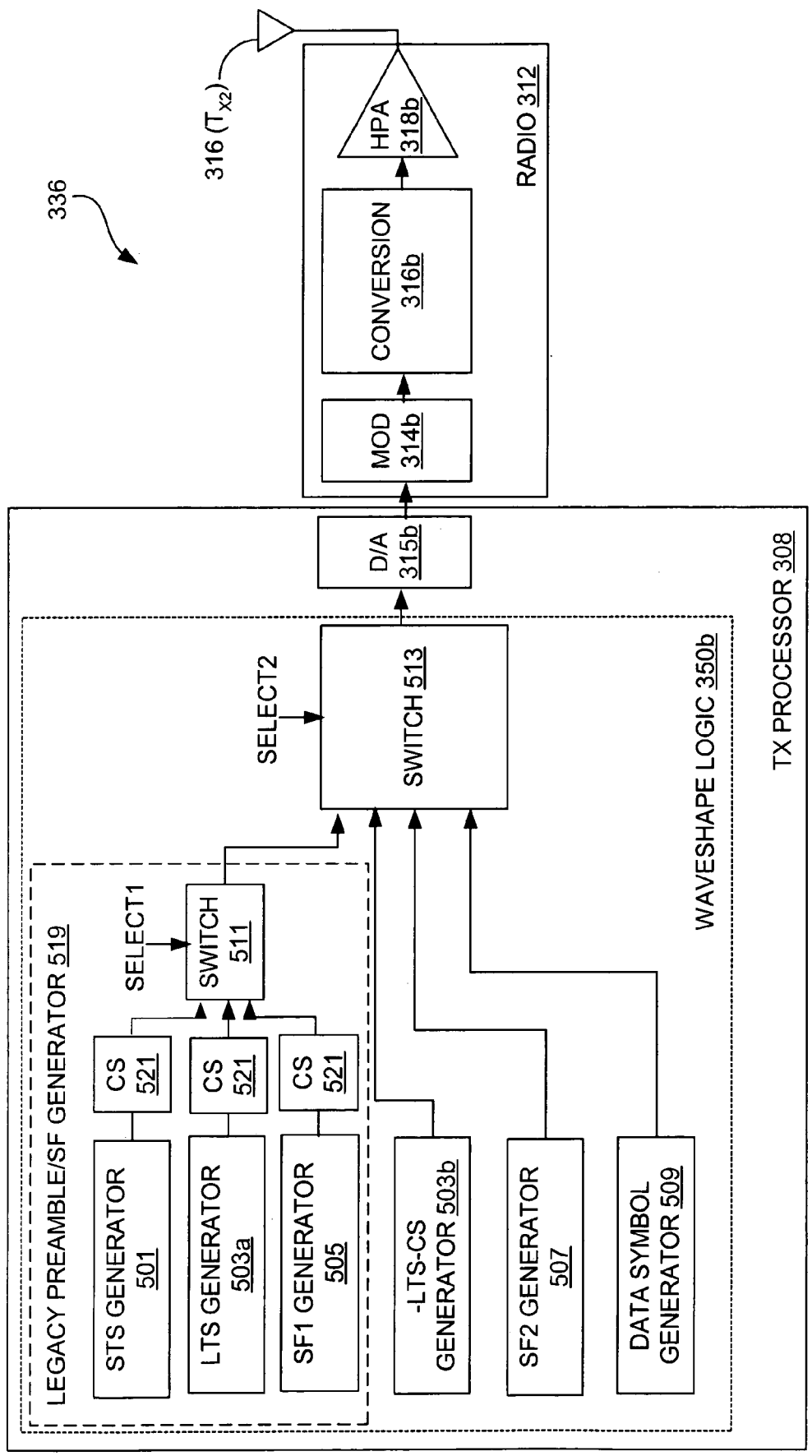
FIG. 5A is a block diagram that illustrates an embodiment of a cyclic shift transmit module of the LCSM system shown in FIG. 3.

FIG. 5A is a block diagram that illustrates an embodiment of module 336, which is configured to provide cyclic shifting of one or more segments of a packet structure. The module 336 comprises the transmit (TX) processor 308, the radio 312, and the second transmit antenna 316. The transmit processor 308 comprises a waveshape logic 350b for generating the cyclically shifted packet structure. The waveshape logic 350b comprises a legacy preamble/signal field (SF) generator 519. The legacy preamble/SF generator 519 comprises a short training symbol (STS) generator 501, a long training symbol (LTS) generator 503a, a SF1 generator 505, cyclic shift modules 521, and a switch 511. Note that in some embodiments, the cyclic shift functionality may be included in the respective generator. The STS generator 501 and LTS generator 503a are configured to generate segments of a legacy preamble. The STS generator 501 generates a STS segment and the LTS generator 503a generates a LTS segment in conformity to 802.11 standards. The SF1 generator 505 generates a signal field segment. These segments are input to the cyclic shift modules 521 to undergo a cyclic shift (e.g., advance or delay), and then the cyclically shifted segments are provided to switch 511, and based on a control signal (Select1), are provided as a coordinated output to switch 513, which also is part of the waveshape logic 350b. The waveshape logic 350b further includes an inverted (represented with a minus sign), cyclically shifted LTS generator 503b (-LTS-CS), a SF2 generator 507, and a data symbol generator 509. In one embodiment, the inverted, cyclically shifted LTS generator 503b is the same device as the LTS generator 303a, with the addition of an inverter that can be disabled or made transparent for legacy portion LTS generation functionality. The SF2 generator 507 receives data rate information, among other information pertaining to spatial multiplexing environments, and the data symbol generator 509 receives data bits. The switch 513 receives the respective segments from generators 503b, 507, and 509, and also receives the segments from switch 511, and based on the control input (Select2), provides the segments in coordinated fashion to the digital-to-analog (D/A) converter 315b of the transmit processor 308.

It would be understood by one having ordinary skill in the art that transmit processor 306 may comprise additional circuitry, as described in association with FIG. 4A.

The radio 312 receives the analog signal corresponding to the packet structure generated in the waveshape logic 350b. The radio 312 comprises a modulator 314b (e.g., in-phase/quadrature (I/Q) modulator and oscillator), conversion logic 316b (e.g., oscillator and mixer), and high power amplifier (HPA) 318b. It would be appreciated by one having ordinary skill in the art that fewer, additional, and/or different components can be included in the module 336. Within the radio 312, the analog transmission signals are modulated, upconverted, and amplified/filtered at modulator 314b, conversion logic 316b, and HPA 318b, respectively. The resulting signal is then transmitted over second transmit antenna 316 ($T_{X2}$).

Figure 5B:
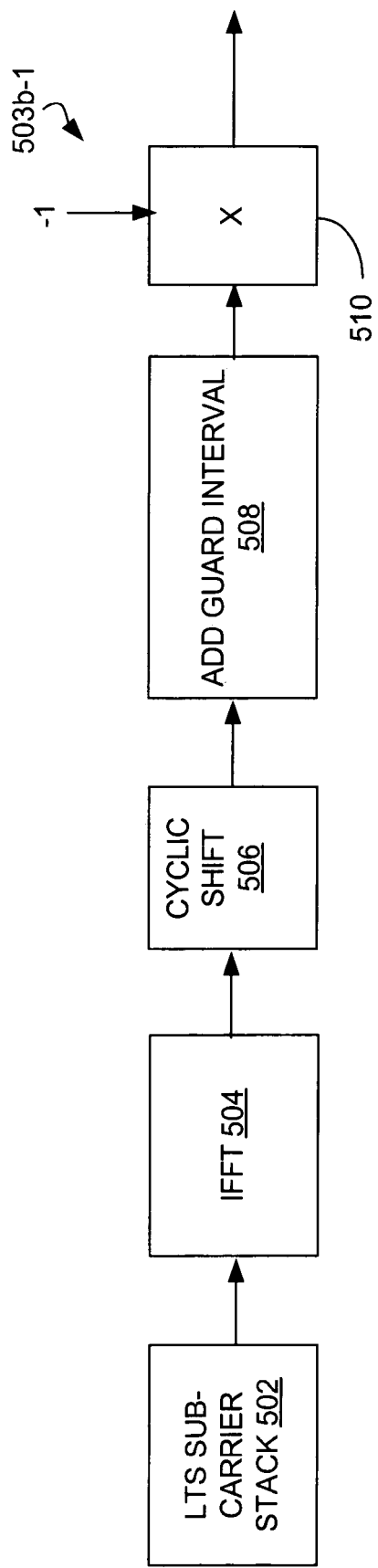
FIGS. 5B-5C are block diagrams that illustrate two embodiments of an inverted LTS-CS (cyclic shifted) generator shown in FIG. 5A.
Figure 5C:
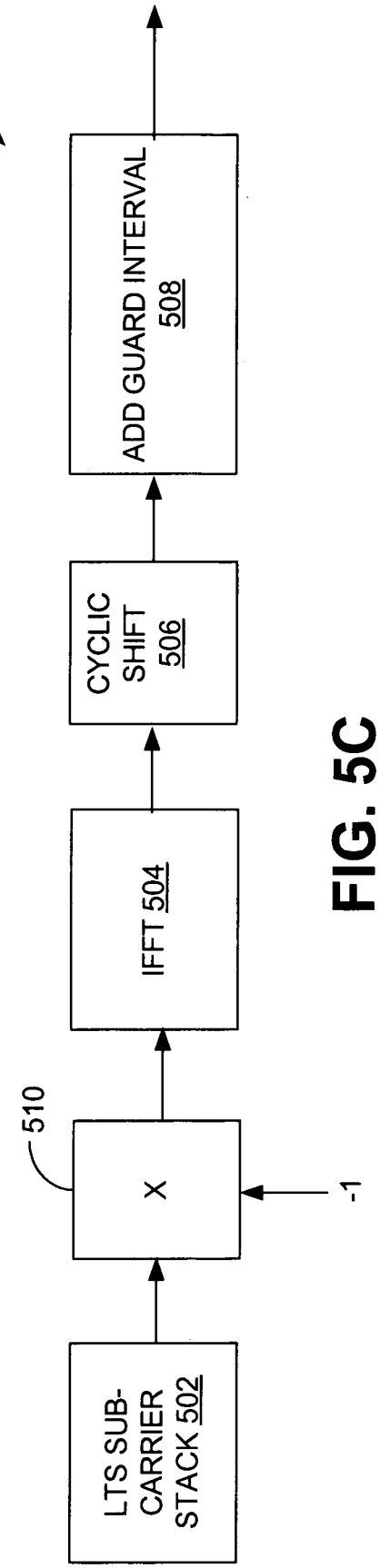

FIGS. 5B-5C are block diagrams that illustrate two embodiments (503b-1 and 503b-2, respectively) of an inverted, cyclically shifted LTS generator 503b that provides cyclic shifting of the MIMO SM portion of a packet to be transmitted over the second transmit antenna 316 ($T_{X2}$). Inverted, cyclically shifted LTS generator embodiments 503b-1 and 503b-2 comprise a LTS carrier subcarrier stack 502, IFFT 504, add guard interval 508, similar to the LTS generator 303a, 303b described in association with FIG. 4B. The inverted, cyclically shifted LTS generator 503b-1 further includes a cyclic shift module 506 to provide cyclic delay or advances to the LTS segment, and an inverter logic (X) 510. With reference to FIG. 5B, a time domain embodiment corresponding to LTS processing is shown. That is, in the inverted, cyclically shifted LTS generator 503b-1, an LTS waveform from LTS subcarrier stack 502 undergoes processing at the IFFT circuitry 504 to provide a time-domain waveform. The resultant samples are cyclically shifted at the cyclic shift module 506, a guard interval added at add guard interval module 508, and inverted at an inverter 510 located after the add guard interval module 508. The inverter module 510 multiples a minus (−) 1 with samples of the cyclically shifted LTS, thus inverting (e.g., make negative) the cyclic shifted LTS in the time domain.

FIG. 5C shows a waveshape logic embodiment 503b-2 that performs inversion in the frequency domain. The waveshape logic embodiment 503b-2 comprises components 502, 504, 506, and 508 similarly structured, yet connected slightly differently compared to the embodiment 503b-1 shown in FIG. 5B. That is, the inverter module 510 is disposed between the LTS subcarrier stack 502 and the IFFT circuitry 504. Each subcarrier corresponding to a cyclically shifted LTS is made negative, and then applied to the IFFT circuitry 504, resulting in a negative cyclically shifted LTS.

Figure 5D:
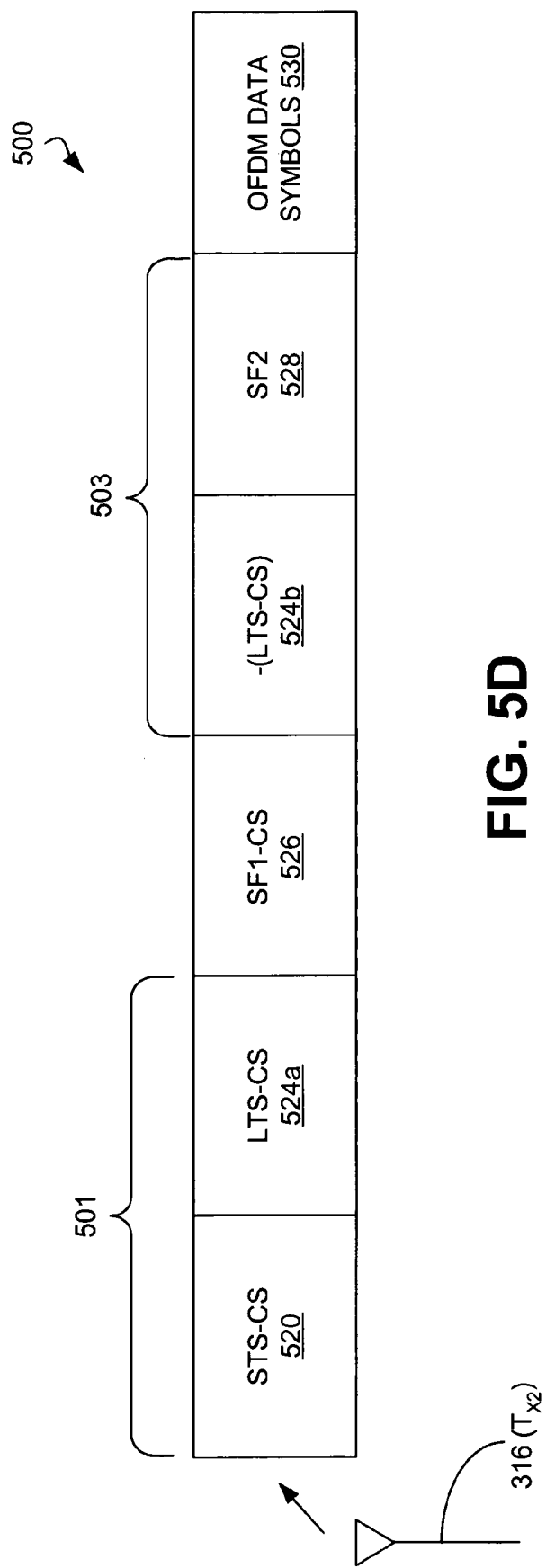
FIG. 5D is a block diagram that illustrates an exemplary packet structure generated by the waveshape logic and transmitted from a second antenna shown in FIG. 5A.

FIG. 5D is a block diagram that illustrates an exemplary packet structure 500 generated by the waveshape logic 350b and transmitted from a second transmit antenna 316 ($T_{X2}$). The packet structure 500 comprises a legacy preamble portion 501 and a MIMO-SM portion 503. Segments 520, 524a, 526, 528, and 530 are similar in function and structure to segments of the same name described in association with FIG. 4D, except with a cyclic shift applied, and thus discussion of the same is omitted for brevity. The MIMO SM portion 503 comprises a cyclically shifted, inverted LTS segment 524b. The signal field (SF2) segment 528 is not cyclically shifted in one embodiment, although some embodiments may cyclically shift the SF2 segment 528, as well as the data symbols 530.

Figure 11:
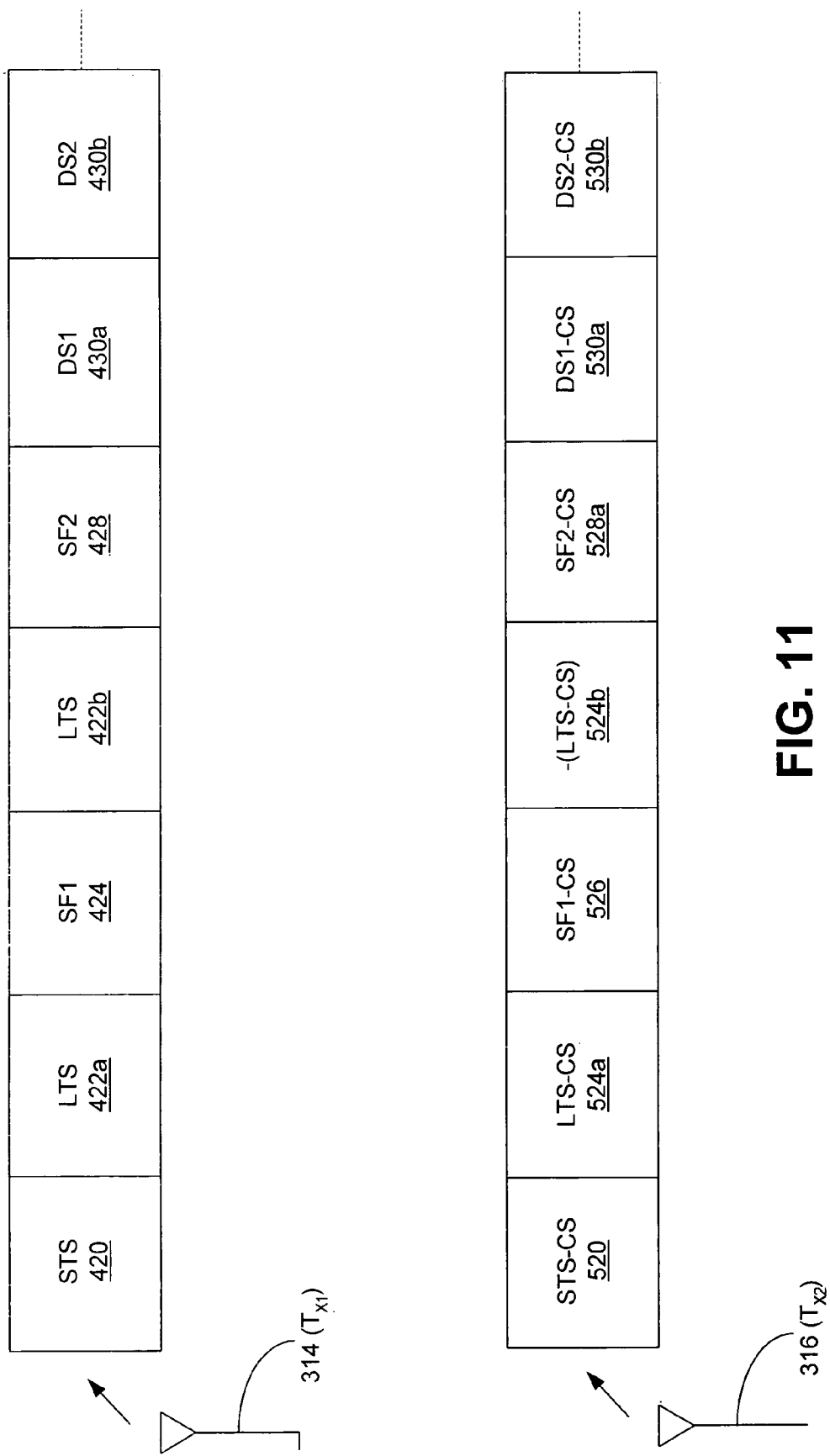
FIG. 11 is a block diagram that illustrates exemplary packet structures generated by the waveshape logic corresponding to two transmit antennas.

Note that in one embodiment, the signal field (SF2) segment 528 and the data symbols 530 for the packet 500 may have the cyclic shift removed (or omitted during the processing). In some embodiments, the SF2 segment 528 and/or data symbols 530 may be cyclically shifted, such as shown in FIG. 11, as shown, all symbols 520-530b on the second transmit antenna 316 are transmitted with a cyclic shift.

Before proceeding with a discussion of the receive processing of the LCSM system 300, reference is made again to FIG. 3. As shown, the LCSM system comprises multiple transmit antennas 314 ($T_{X1}$) and 316 ($T_{X2}$) and multiple receive antennas 318 ($R_{X1}$) and 320 ($R_{X2}$) in a spatial multiplexing environment. That is, multipath exists at first receive antenna 318, corresponding to signals provided from first transmit antenna 314 to first receive antenna 318 and from second transmit antenna 316 to first receive antenna 318. Similarly, multipath exists at second receive antenna 320, corresponding to signals provided from first transmit antenna 314 to second receive antenna 320 and from second transmit antenna 316 to second receive antenna 320. Each receive antenna 318 and 320 estimates two multipath channels, one from each of the two transmit antennas 314 and 316. For example, since there are two receive antennas 318 and 320, four channels ($H_{11}$, $H_{12}$, $H_{21}$, $H_{22}$) can be estimated, as shown by Equation (1):

$$\begin{bmatrix} Rx_1 \\ Rx_2 \end{bmatrix} = \begin{bmatrix} H_{11} & H_{12} \\ H_{21} & H_{22} \end{bmatrix} \begin{bmatrix} Tx_1 \\ Tx_2 \end{bmatrix} \qquad \text{Eq. (1)}$$

Equation (1) is computed on a subcarrier by subcarrier basis in OFDM environments. For instance, at the first receive antenna 318, a subcarrier at a defined amplitude and phase emitted from first transmit antenna 314 and a subcarrier of a defined amplitude and phase from second transmit antenna 316 is received and interference may result. The equation (1) is performed for each subcarrier received to determine the amplitude and phase.

Figure 6:
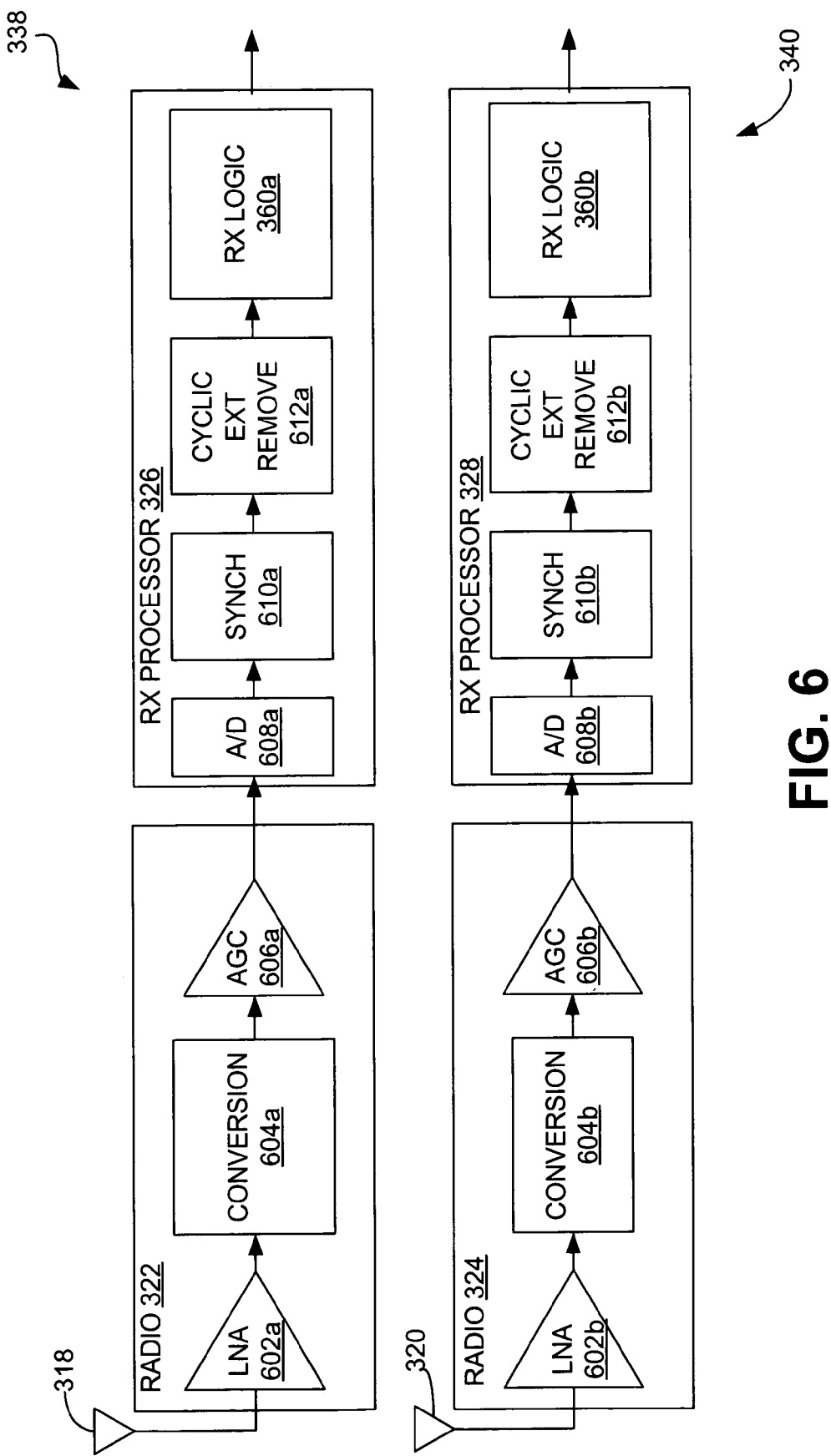
FIG. 6 is a block diagram that illustrates receive module embodiments of the LCSM system shown in FIG. 3.

FIG. 6 is a block diagram that illustrates receive module embodiments 338 and 340. The module 338 comprises a first receive antenna 318, radio 322, and receive (RX) processor 326. The radio 322 comprises a low noise amplifier (LNA) 602a, conversion logic 604a (e.g., mixer and oscillator), and automatic gain control (AGC) logic 606a. The receive (RX) processor 326 comprises analog-to-digital (A/D) converter 608a, synchronization logic 610a, cyclic extension removal logic 612a, and receive (RX) logic 360a. Additional processing blocks may be included in module 338 in some embodiments, such as a matched filter combiner(s), memory, state logic, signal separator, among other components. Module 340 comprises similar or the same components as module 338, with similar or the same connections, including a second receive antenna 320, radio 324 (comprising LNA 602b, conversion logic 604b, and AGC 606b), and receive (RX) processor 328 (comprising A/D 608b, synchronization logic 610b, cyclic extension removal logic 612b, and RX logic 360b). The discussion of module 340 is omitted for brevity, and discussion below will focus on module 338 with the understanding that the same or similar processing applies to module 340.

Referring to module 338, the signals transmitted from first and second transmit antennas 314 and 316, respectively, are received at first receive antenna 318 and provided to the low noise amplifier (LNA) 602a. The LNA 602a filters the signal and provides the filtered signal to conversion logic 604a, where the filtered signal is downconverted to baseband (e.g., in-phase (I) and quadrature (Q) signals), or intermediate frequency (IF) in some embodiments. The downconverted signal is provided to AGC 606a, where the signal is amplified. In some embodiments, the AGC 606a may provide the receiver power level back to the transmitter device 302, such as to assist the transmitter device 302 in determining effective transmission methods. The amplified I and Q signals are converted to the digital domain at A/D converter 608a of the receive processor 326. The A/D converter 608a provides the digital data to the synchronization logic 610a. The synchronization logic 610a recovers the clock signal and corrects for differences between the oscillation frequency of the local oscillator of the transmitter device 302 and the oscillation frequency of the local oscillator of the receiver device 304. The digital data is further provided to the cyclic extension removal logic 612a, which removes un-needed cyclic extensions, and then to the receive logic 360a.

Assume that the receive antenna 318 receives packet 400 and 500 transmitted from first transmit antenna 314 and second transmit antenna, respectively, LTS1 corresponding to the legacy LTS 422a (from first transmit antenna 314) and cyclic shifted legacy LTS-CS 524a (from second transmit antenna 316), LTS2 corresponds to the MIMO SM LTS 422b (from first transmit antenna 314) and cyclic shifted MIMO SM LTS-CS 524b (from second transmit antenna 316). RLTS1 and RLTS2 correspond to the first receive antenna 318 receipt of the LTS1 and LTS2, respectively. That is, during reception of RLTS1, the first receive antenna 318 experiences interference corresponding to LTS1 from first transmit antenna 314 weighted by the multipath channel $H_1$ (i.e, $H_{11}$) interfering with the signal delivered from second transmit antenna 316 weighted by its multipath channel $H_2$ (i.e., $H_{12}$). Likewise, during reception of RLTS2, two signals weighted by their respective channels ($H_1$ and $H_2$) arrive simultaneously, or substantially simultaneously, to cause interference. Processing in the receive logic 360a is performed to separate the two signals (corresponding to each transmit antenna 314 and 316), resulting in the following equations (2) and (3):

$$RLTS1 = H1*LTS + H2*LTS\text{-}CS, \qquad \text{Eq. (2)}$$

$$RLTS2 = H1*LTS - H2*LTS\text{-}CS, \qquad \text{Eq. (3)}$$

A Walsh transform is performed on RLTS1 and RLTS2 in either the time domain or the frequency domain. To obtain information corresponding to the first transmit antenna 314, RLTS1 is added to RLTS2 as shown in Equation (4):

$$RLTS1 + RLTS2 = 2*H1*LTS \qquad \text{Eq. (4)}$$

The result of this operation is information corresponding to the first transmit antenna 314 (the information corresponding to the second transmit antenna 316 dropped out because of the minus sign before $H_2$). That is, the second transmit antenna 316 transmitted a negative, cyclic shifted copy of itself during the MIMO SM timeslot (i.e., -(LTS-CS) 524b).

To obtain the information corresponding to second transmit antenna 316, the following computation is performed:

$$RLTS1 - RLTS2 = 2*H2*LTS\text{-}CS \qquad \text{Eq. (5)}$$

The result of this operation is that constructive addition of the information corresponding to the second transmit antenna 316 is achieved (mathematically, a negative of a negative equals a positive), dropping out the information corresponding to the first transmit antenna 314. Thus, separation of signals from the transmit antennas 314 and 316 is accomplished through the Walsh coding. Computation of the amplitude and phase of the separated signals (channel estimation) is performed on the separated signals. For instance, by dividing both sides of equation (4) by 2LTS (i.e., 2*LTS), the following equation (6) is derived for $H_1$:

$$H_1 = (RLTS1 + RLTS2)/(2LTS) \qquad \text{Eq. (6)}$$

To arrive at the channel estimation for $H_2$, equation (5) is divided on both sides by 2LTS-CS, resulting in Equation (7):

$$H_2 = (RLTS1 - RLTS2)/(2LTS\text{-}CS) \qquad \text{Eq. (7)}$$

Thus, channel estimates for H1 and H2 have been computed.

Figure 7A:
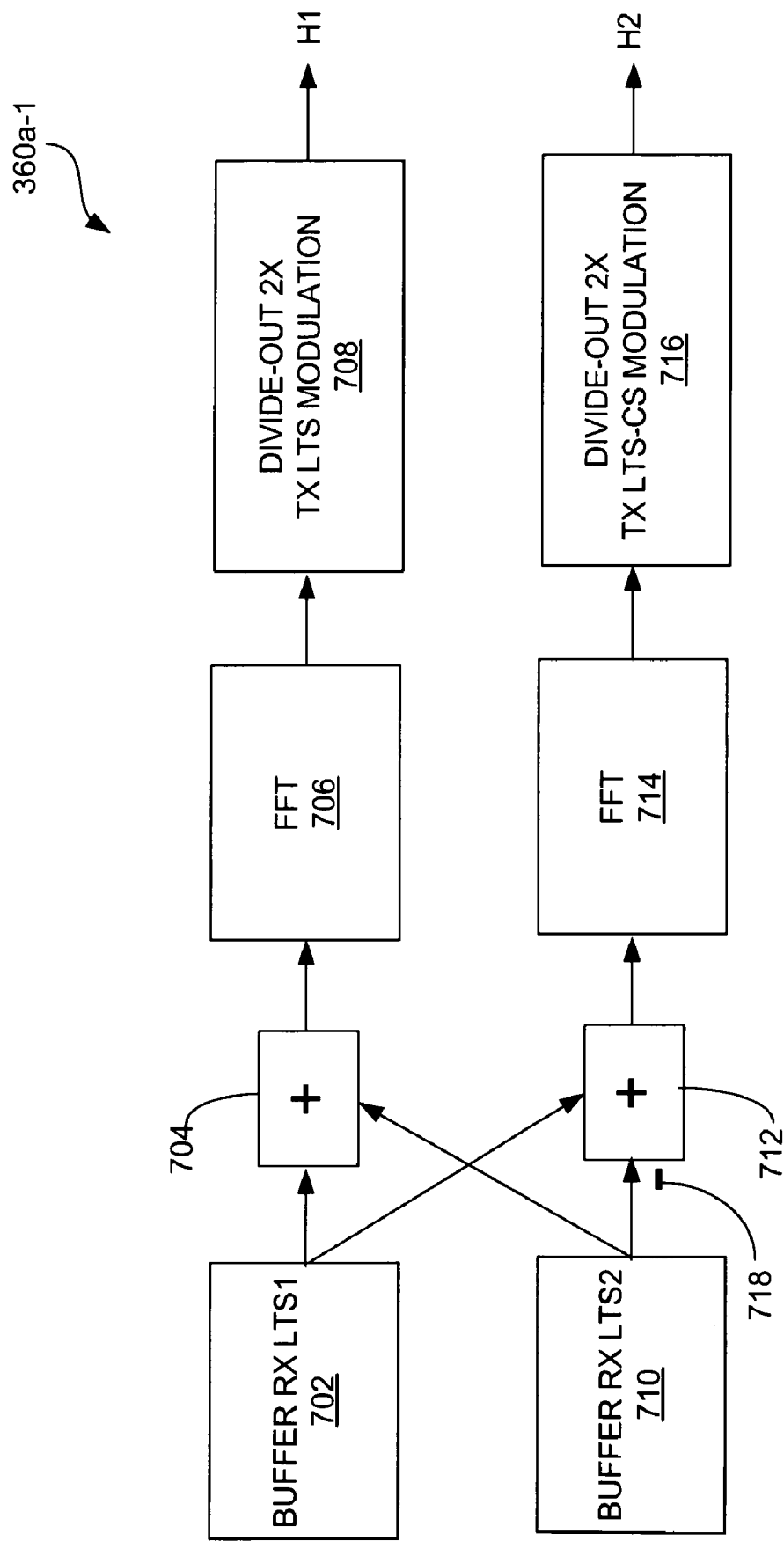
FIGS. 7A-7B are block diagrams that illustrate embodiments of receive logic of one of the receive modules shown in FIG. 6 corresponding to channel estimation.
Figure 7B:
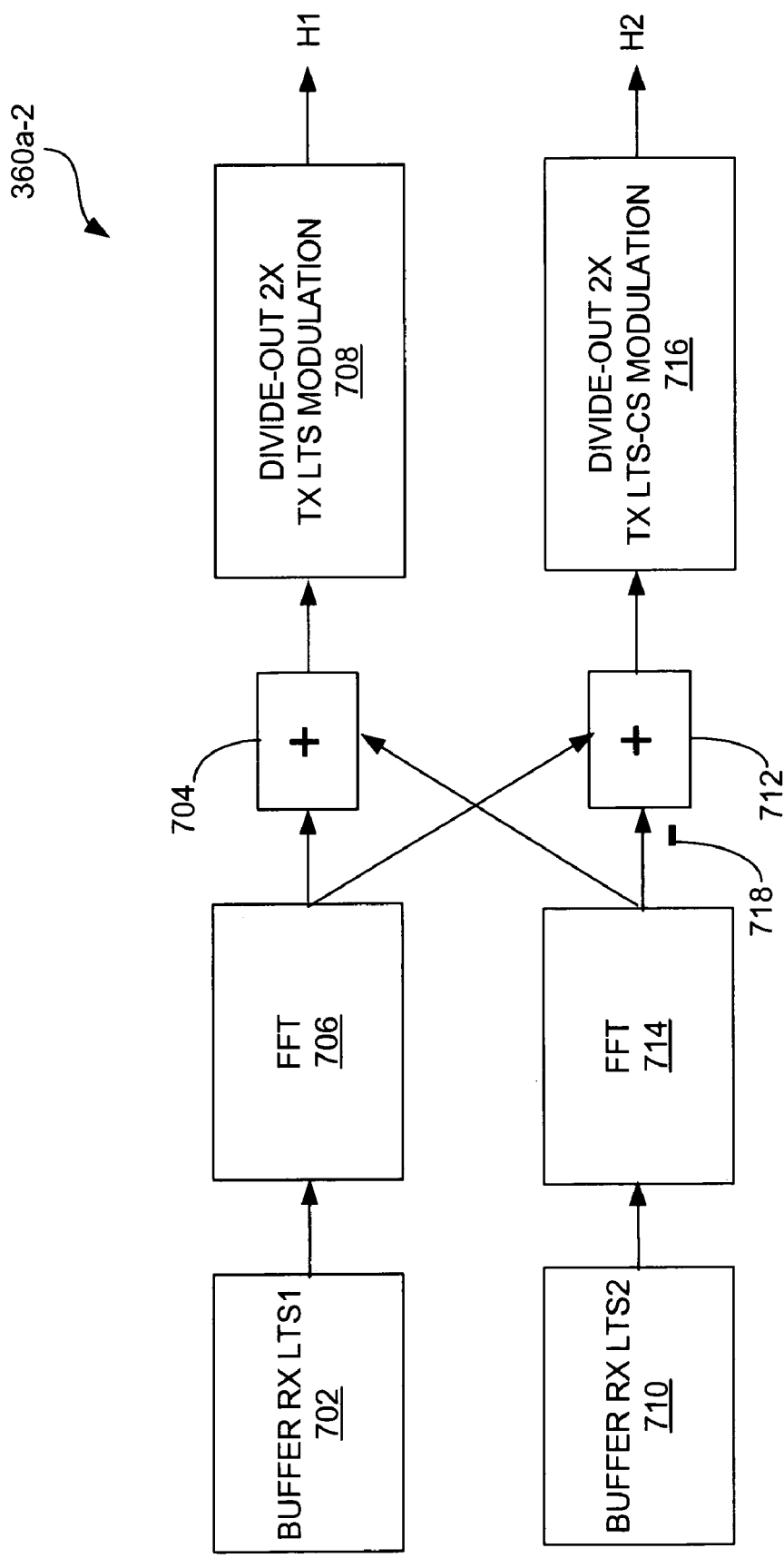

FIGS. 7A-7B are block diagrams that illustrate an embodiment of receive logic 360a-1 and 360a-2, respectively, that performs the computations described above corresponding to equations (2)-(7). FIG. 7A corresponds to Walsh processing in the time domain, and FIG. 7B corresponds to Walsh processing in the frequency domain. Referring to FIG. 7A, the receive logic 360a-1 comprises buffer receive (RX) LTS1 (or RLTS1 buffer) 702 and buffer receive (RX) LTS2 (or RLTS2 buffer) 710 (herein, buffers 702 and 710), adders 704 and 712, FFT modules 706 and 714, and divide-out 2X TX LTS modulation module 708 (herein module 708) and divide-out 2X TX LTS-CS modulation module 716 (herein module 716). The RLTS values are stored in buffers 702 and 710, and provided to adders 704 and 712 (subtracted at adder 712, as shown by minus sign 718). The resultant values are transformed at FFT modules 706 and 714 to reproduce the frequency subcarriers, and the transformed values are divided out at modules 708 and 716 to arrive at the channel estimates $H_1$ and $H_2$.

Referring to FIG. 7B, an embodiment of receive logic 360a-2 is shown that performs Walsh coding in the frequency domain. As shown, components 702, 706, 704, 708, 710, 714, 712, and 716 are the same, but rearranged in sequence of operations such that Walsh coding occurs at adders 704 and 712 (where subtraction is represented with minus sign 718) after the FFT modules 706 and 714 transform the values to the frequency domain.

In another embodiment, a cyclic shifted channel estimate may be computed in association with the second transmit antenna 316. That is, equations (2)-(6) remain as described above, but equation (7) is replaced with equation (8), which is as follows:

$$H_2\text{-}CS = (RLTS1 - RLTS2)/(2LTS) \qquad \text{Eq. (8)}$$

That is, equation (5) is divided by a non-cyclic shifted LTS, and the result is a cyclic shifted version of $H_2$ (i.e., $H_2$-CS).

Figure 8A:
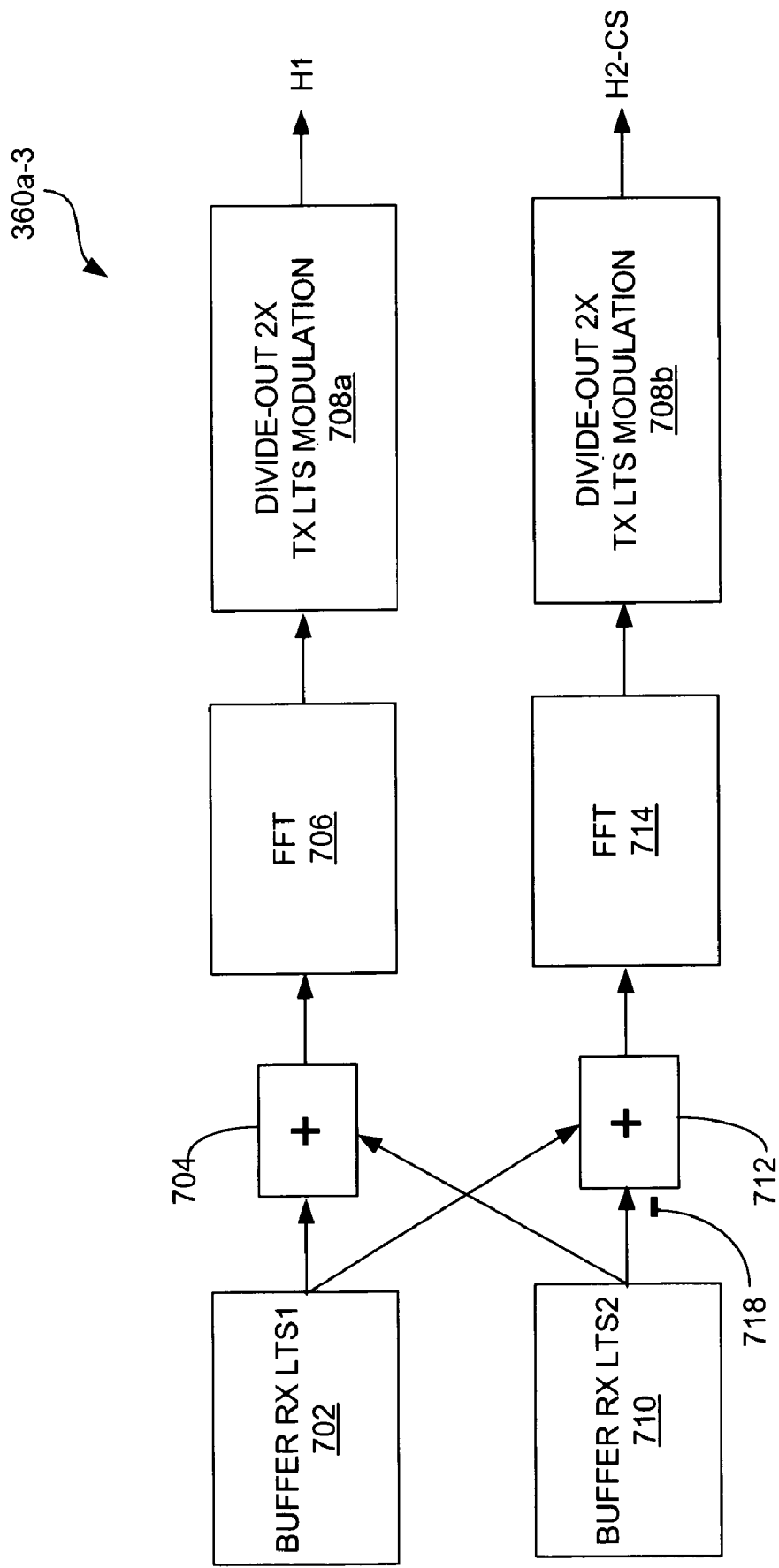
FIGS. 8A-8B are block diagrams that illustrate embodiments of receive logic of one of the receive modules shown in FIG. 6 corresponding to channel estimation with at least one channel estimate having a cyclic shift.
Figure 8B:
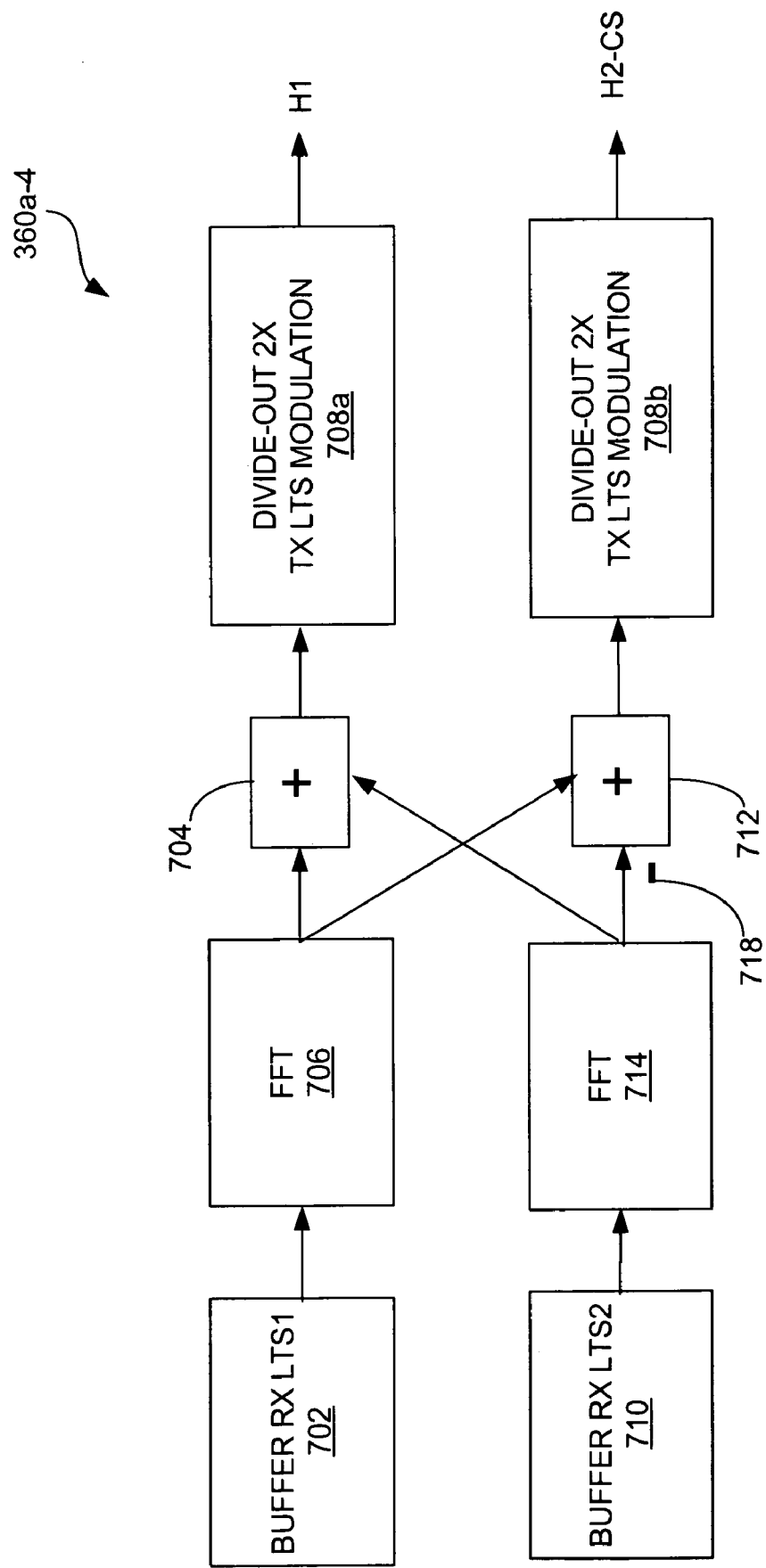

FIGS. 8A-8B are block diagrams that illustrate two embodiments of receive logic 360a-3 and 360a-4, respectively, where channel estimate $H_2$ is cyclic shifted, and Walsh coding is performed in the time domain (FIG. 8A) and the frequency domain (FIG. 8B). With reference to FIG. 8A, the receive logic 360*a*-3 comprises buffer receive (RX) LTS1 (or RLTS1 buffer) 702 and buffer receive (RX) LTS2 (or RLTS2 buffer) 710 (herein, buffers 702 and 710), adders 704 and 712, FFT modules 706 and 714, and divide-out 2X TX LTS modulation module 708*a* (herein module 708*a*) and divide-out 2X TX LTS-CS modulation module 708*b* (herein module 708*b*). Note that modules 708*a* and 708*b* may be shared logic. The RLTS values are stored in buffers 702 and 710, provided to adders 704 and 712 (subtracted at adder 712, as shown by minus sign 718). The resultant values are transformed at FFT modules 706 and 714 to reproduce the frequency subcarriers, and the transformed values are divided out at modules 708*a* and 708*b* to arrive at the channel estimates $H_1$ and $H_2$-CS.

Referring to FIG. 8B, an embodiment of receive logic 360*a*-4 is shown that performs Walsh coding in the frequency domain. As shown, components 702, 706, 704, 708*a*, 708*b*, 714, 712, and 710 are the same, but rearranged in sequence of operations such that Walsh coding occurs at adders 704 and 712 (where subtraction is represented with minus sign 718) after the FFT modules 706 and 714 transform the values to the frequency domain.

Although described in the context of 20 mega-Hertz (MHz) wide channels, it would be understood by those having ordinary skill in the art that 40 MHz wide channels will similarly apply. That is, two 20 MHz packets can be transmitted on two different frequencies. For instance, corresponding to first transmit antenna 314, the lower 20 MHz channel may have the following sequence: LTS, SF1, LTS, SF2, and then data symbols, similar to the packet sequence shown in FIG. 4D. Likewise, on the upper 20 MHz channel, the same sequence may be followed. Corresponding to second transmit antenna 316, the following sequence may be employed: LTS-CS, SF1-CS, -(LTS-CS), SF2-CS (or non-cyclic shifted), and data symbols with or without CS may be employed subsequently, similar to the sequence shown in FIG. 5D.

Process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

Figure 9:
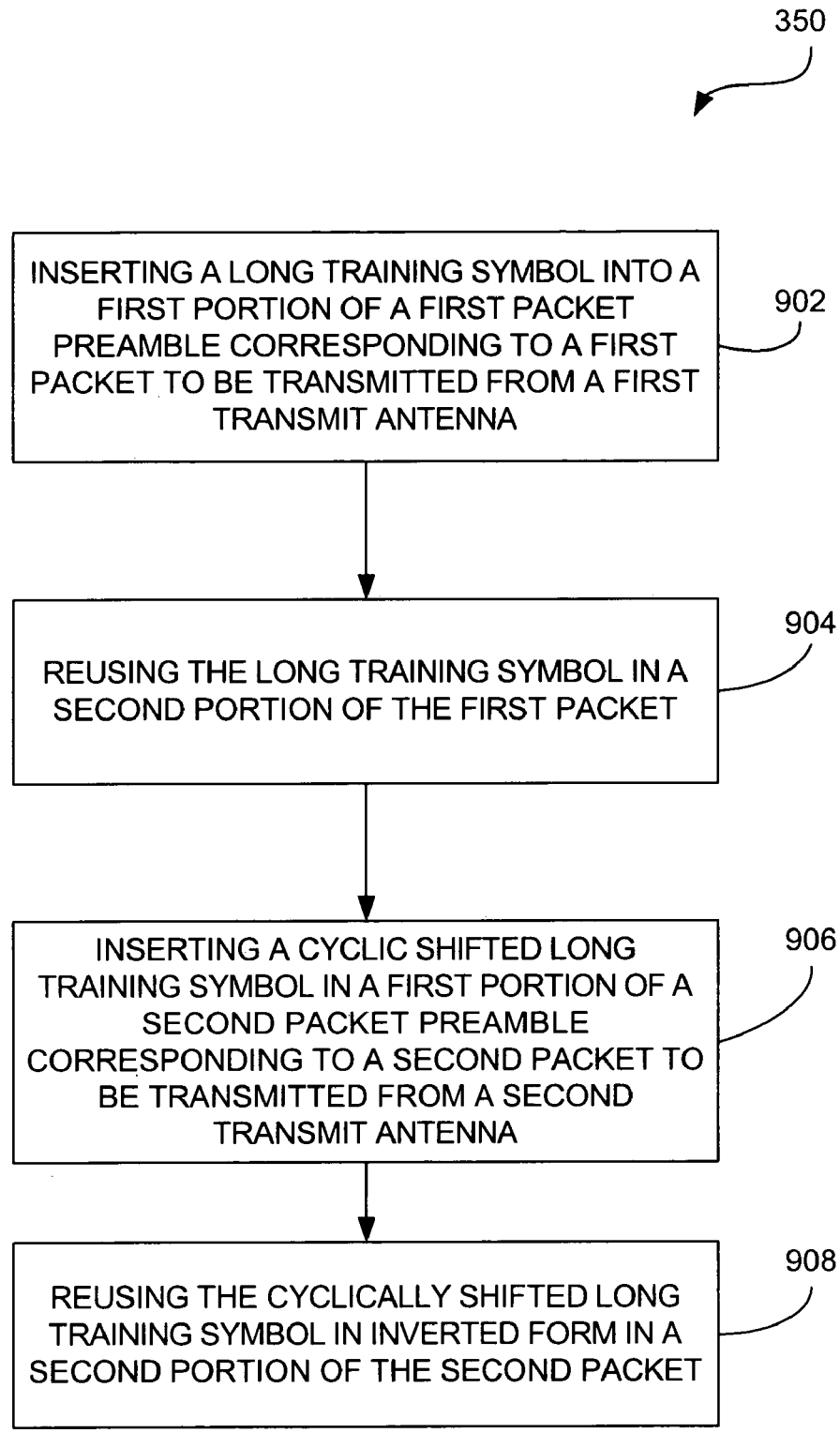
FIG. 9 is a flow diagram that illustrates one method embodiment for generating a packet having a legacy preamble and spatial multiplexing portion.

As will be appreciated from the above description, one embodiment of a packet generation method 350 comprises, as illustrated in FIG. 9, inserting a long training symbol into a first portion of a first packet preamble corresponding to a first packet to be transmitted from a first transmit antenna (902), reusing the long training symbol in a second portion of the first packet (904), inserting a cyclic shifted long training symbol in a first portion of a second packet preamble corresponding to a second packet to be transmitted from a second transmit antenna (906), and reusing the cyclically shifted long training symbol in inverted form in a second portion of the second packet (908).

Figure 10:
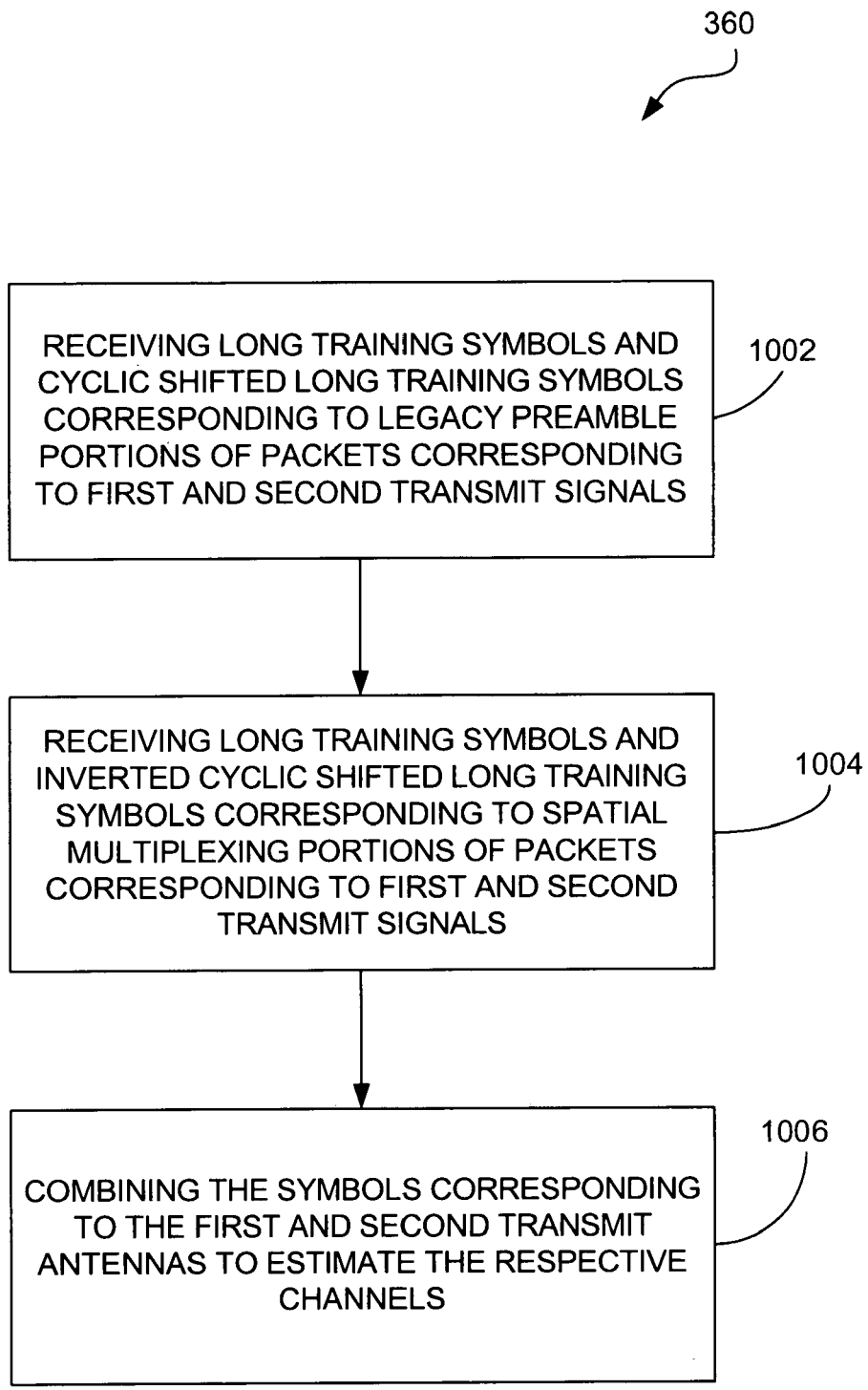
FIG. 10 is a flow diagram that illustrates one channel estimating method embodiment.

As will be appreciated from the above description, embodiments of a packet reception method 360 comprise, as shown in FIG. 10, receiving long training symbols and cyclic shifted long training symbols corresponding to legacy preamble portions of packets corresponding to first and second transmit signals (1002), receiving long training symbols and inverted cyclic shifted long training symbols corresponding to spatial multiplexing portions of packets corresponding to first and second transmit signals (1004), and combining the symbols corresponding to the first and second transmit antennas to estimate the respective channels (1006).

Note that in some embodiments, packets from a first transmitter and a second transmitter comprise segments that, in one embodiment, are time-aligned. That is, corresponding segments are transmitted in time-aligned fashion. For example, the STS segment from a packet sent from a first transmit antennas is time-aligned (e.g., has the same beginning and end time boundary, and thus duration) with a cyclic shifted STS segment corresponding to a packet transmitted from a second transmit antenna, and the LTS segment transmitted from the first transmit antennas is time aligned with the cyclic shifted LTS segment of the second transmit antennas, etc. This is made possible by sharing a common digital clock (synchronized digital circuits) for the signal generators both antennas. This is implicit in the transmitter device 302 shown in FIG. 3.

It should be emphasized that the above-described embodiments of the present disclosure, particularly, any "preferred" embodiments, are merely possible examples of implementations, merely set forth for a clear understanding of the principles of the disclosed systems and methods. Many variations and modifications may be made to the above-described embodiment(s) without departing substantially in scope. All such modifications and variations are intended to be included herein within the scope of this disclosure.

What is claimed:

1. A method comprising:
   generating a first packet comprising two copies of a long training symbol;
   generating a second packet comprising a cyclically-shifted long training symbol and an inverted version of the cyclically-shifted long training symbol;
   transmitting the first packet from a first antenna; and
   transmitting the second packet from a second antenna.

2. The method of claim 1, wherein the cyclically-shifted long training symbol of the second packet corresponds to a cyclically advanced or delayed copy of the long training symbol of the first packet.

3. The method of claim 1, wherein one copy of the long training symbol of the first packet and the inverted version of the cyclically-shifted long training symbol of the second packet correspond to a spatial multiplexing transmission protocol.

4. The method of claim 1, wherein the first and second packets further comprise OFDM data symbols.

5. The method of claim 1, wherein the first packet further comprises OFDM data symbols, and wherein the second packet further comprises cyclically-shifted OFDM data symbols.

6. A method, comprising:
   receiving a first packet on a first channel at an antenna, wherein the first packet comprises two copies of a long training symbol;
   receiving a second packet on a second channel at the antenna, wherein the second packet comprises a cyclically-shifted long training symbol and an inverted version of the cyclically-shifted long training symbol; and
   determining a channel estimate for the first and second transmission channels based on the two copies of the long training symbol, the cyclically-shifted long training symbol, and the inverted version of the cyclically-shifted long training symbol.

7. The method of claim 6, wherein determining a channel estimate comprises performing a Walsh transform in the time domain.

8. The method of claim 6, wherein determining a channel estimate comprises performing a Walsh transform in the frequency domain.

9. The method of claim 6, wherein determining a channel estimate for the first and second channels is based on the equations:

$$H1=(RLTS1+RLTS2)/(2*LTS)$$

$$H2=(RLTS1-RLTS2)/(2*LTSCS)$$

wherein H1 corresponds to the channel estimate for the first channel;

wherein H2 corresponds to the channel estimate for the second channel;

wherein RLTS1 corresponds to the combination of the received first copy of the long training symbol of the first packet and the received cyclically-shifted long training symbol of the second packet;

wherein RLTS2 corresponds to the combination of the received second copy of the long training symbol of the first packet and the received inverted version of the cyclically-shifted long training symbol of the second packet;

wherein LTS corresponds to the long training symbol; and wherein LTSCS corresponds to the cyclic-shifted long training symbol.

10. The method of claim 6, wherein determining a channel estimate comprises determining a channel estimate for the first channel and determining a cyclically-shifted channel estimate for the second channel based on the equations:

$$H1=(RLTS1+RLTS2)/(2*LTS)$$

$$H2CS=(RLTS1-RLTS2)/(2*LTS)$$

wherein H1 corresponds to the channel estimate for the first channel;

wherein H2CS corresponds to the cyclically-shifted channel estimate for the second channel;

wherein RLTS1 corresponds to the combination of the received first copy of the long training symbol of the first packet and the received cyclically-shifted long training symbol of the second packet;

wherein RLTS2 corresponds to the combination of the received second copy of the long training symbol of the first packet and the received inverted version of the cyclically-shifted long training symbol of the second packet; and wherein LTS corresponds to the long training symbol.

11. The method of claim 6, wherein the first and second packets further comprise OFDM data symbols.

12. The method of claim 6, wherein the first packet further comprises OFDM data symbols, and wherein the second packet further comprises cyclically-shifted OFDM data symbols.

13. A system, comprising:

a first transmit processor configured to generate a first packet comprising two copies of a long training symbol; and a second transmit processor configured to generate a second packet comprising a cyclically-shifted long training symbol and an inverted version of the cyclically-shifted long training symbol.

14. The system of claim 13, wherein the first transmit processor is communicatively coupled to a first antenna configured to transmit the first packet, and wherein the second transmit processor is communicatively coupled to a second antenna configured to transmit the second packet.

15. The system of claim 13, wherein the cyclically-shifted version of the long training symbol associated with the second packet corresponds to a cyclically advanced or delayed copy of the long training symbol associated with the first packet.

16. The system of claim 13, wherein one copy of the long training symbol of the first packet and the inverted version of the cyclically-shifted long training symbol of the second packet correspond to a spatial multiplexing transmission protocol.

17. The system of claim 13, wherein the first and second transmit processors comprise one of hardware or a combination of hardware and software.

18. The system of claim 13, wherein the first and second packets further comprise OFDM data symbols.

19. The system of claim 13, wherein the first packet further comprises OFDM data symbols, and wherein the second packet further comprises cyclically-shifted OFDM data symbols.

20. A system, comprising:

a receive processor configured to determine a channel estimate for a first and second channel based on a first packet received on the first channel from a first antenna and a second packet received on the second channel from a second antenna, wherein the first packet comprises two copies of a long training symbol, and wherein the second packet comprises a cyclically-shifted long training symbol and an inverted version of the cyclically-shifted long training symbol.

21. The system of claim 20, wherein the first and second receive processors are further configured to compute a Walsh transform in the time domain.

22. The system of claim 20, wherein the first and second receive processors are further configured to compute a Walsh transform in the frequency domain.

23. The system of claim 20, wherein the first and second receive processors comprise one of hardware or a combination of hardware and software.

24. The system of claim 20, wherein the first receiver processor is configured to determine a channel estimate for the first channel and the second channel based on the equations:

$$H1=(RLTS1+RLTS2)/(2*LTS)$$

$$H2=(RLTS1-RLTS2)/(2*LTSCS)$$

wherein H1 corresponds to the channel estimate for the first channel;

wherein H2 corresponds to the channel estimate for the second channel;

wherein RLTS1 corresponds to the combination of the received first copy of the long training symbol of the first packet and the received cyclically-shifted long training symbol of the second packet;

wherein RLTS2 corresponds to the combination of the received second copy of the long training symbol of the first packet and the received inverted version of the cyclically-shifted long training symbol of the second packet;

wherein LTS corresponds to the long training symbol; and wherein LTSCS corresponds to the cyclic-shifted long training symbol.

25. The system of claim 20, wherein the first receiver processor is configured to determine a channel estimate for the first channel and a cyclically-shifted channel estimate for the second channel based on the equations:

$H1 = (RLTS1 + RLTS2)/(2*LTS)$ $H2CS = (RLTS1 - RLTS2)/(2*LTS)$ wherein H1 corresponds to the channel estimate for the first channel;

wherein H2CS corresponds to the cyclically-shifted channel estimate for the second channel;

wherein RLTS1 corresponds to the combination of the received first copy of the long training symbol of the first packet and the received cyclically-shifted long training symbol of the second packet;

wherein RLTS2 corresponds to the combination of the received second copy of the long training symbol of the first packet and the received inverted version of the cyclically-shifted long training symbol of the second packet; and wherein LTS corresponds to the long training symbol.

26. The system of claim 20, wherein the first and second packets further comprise OFDM data symbols.

27. The system of claim 20, wherein the first packet further comprises OFDM data symbols, and wherein the second packet further comprises cyclically-shifted OFDM data symbols.

28. A communication system comprising:

A first antenna and a second antenna;

A first transmit processor means for generating a first packet comprising two copies of a long training symbol wherein the first transmit processor means for generating a first packet is communicatively coupled to said first antenna to transmit the first packet; and a second transmit processor means for generating a second packet comprising a cyclically-shifted long training symbol and an inverted version of the cyclically-shifted long training symbol, wherein the second transmit processor means for generating a second packet is communicatively coupled to said second antenna configured to transmit the second packet.

29. The system of claim 28, wherein the cyclically-shifted version of the long training symbol associated with the second packet corresponds to a cyclically advanced or delayed copy of the long training symbol associated with the first packet.

30. The system of claim 28, wherein one copy of the long training symbol of the first packet and the inverted version of the cyclically-shifted long training symbol of the second packet correspond to a spatial multiplexing transmission protocol.

31. The system of claim 28, wherein the first and second packets further comprise OFDM data symbols.

32. The system of claim 28, wherein the first packet further comprises OFDM data symbols, and wherein the second packet further comprises cyclically-shifted OFDM data symbols.

33. The system of claim 28, further comprising:

means for receiving the first packet on a first channel from the first antenna and for receiving the second packet on a second channel from the second antenna; and means for determining a channel estimate for the first and second channels based on the first packet's long training symbols, the second packet's cyclically-shifted long training symbol, and the second packet's inverted cyclically-shifted long training symbol.

34. The system of claim 33, wherein the means for determining the channel estimate is configured to determine a channel estimate for the first channel and the second channel based on the equations:

$H1 = (RLTS1 + RLTS2)/(2*LTS)$ $H2 = (RLTS1 - RLTS2)/(2*LTSCS)$ wherein H1 corresponds to the channel estimate for the first channel;

wherein H2 corresponds to the channel estimate for the second channel;

wherein RLTS1 corresponds to the combination of the received first copy of the long training symbol of the first packet and the received cyclically-shifted long training symbol of the second packet;

wherein RLTS2 corresponds to the combination of the received second copy of the long training symbol of the first packet and the received inverted version of the cyclically-shifted long training symbol of the second packet;

wherein LTS corresponds to the long training symbol; and wherein LTSCS corresponds to the cyclic-shifted long training symbol.

35. The system of claim 33, wherein the means for determining the channel estimate is configured to determine a channel estimate for the first channel and a cyclically-shifted channel estimate for the second channel based on the equations:

$H1 = (RLTS1 + RLTS2)/(2*LTS)$ $H2CS = (RLTS1 - RLTS2)/(2*LTS)$ wherein H1 corresponds to the channel estimate for the first channel;

wherein H2CS corresponds to the cyclically-shifted channel estimate for the second channel;

wherein RLTS1 corresponds to the combination of the received first copy of the long training symbol of the first packet and the received cyclically-shifted long training symbol of the second packet;

wherein RLTS2 corresponds to the combination of the received second copy of the long training symbol of the first packet and the received inverted version of the cyclically-shifted long training symbol of the second packet; and wherein LTS corresponds to the long training symbol.

36. The system of claim 28, wherein the first and second packets further comprise OFDM data symbols.

37. The system of claim 28, wherein the first packet further comprises OFDM data symbols, and wherein the second packet further comprises cyclically-shifted OFDM data symbols.

* * * * *

UNITED STATES PATENT AND TRADEMARK OFFICE
CERTIFICATE OF CORRECTION

PATENT NO.        : 7,643,453 B2                                               Page 1 of 1
APPLICATION NO.   : 11/159812
DATED             : January 5, 2010
INVENTOR(S)       : Mark A. Webster et al.

It is certified that error appears in the above-identified patent and that said Letters Patent is hereby corrected as shown below:

Title page, item (*) Notice:   should read as follows:   Subject to any disclaimer, the term of this patent is extended or adjusted under 35 U.S.C. 154(b) by 929 days.

Col. 16, claim 20 should read as follows:

20.   A system comprising:

a first receive processor configured to determine a channel estimate for a first and second channel based on a first packet received on the first channel from a first transmit antenna and a second packet received on the second channel from a second transmit antenna, wherein the first packet comprises two copies of a long training symbol, and wherein the second packet comprises a cyclically-shifted long training symbol and an inverted version of the cyclically-shifted long training symbol; and
a second receive processor configured to determine a channel estimate for a third and fourth channel based on the first packet received on the third channel from the first transmit antenna and the second packet received on the fourth channel from the second transmit antenna.

Claim 24, at col. 16, lines 41-42:

Delete "the first receiver processor" and replace with --the first receive processor.--

Claim 25, at col. 24, lines 64-65:

Delete "the first receiver processor" with --the first receive processor.--

Signed and Sealed this

Seventeenth Day of August, 2010

David J. Kappos
*Director of the United States Patent and Trademark Office*